United States Patent [19]
Fukushima

[11] Patent Number: 5,805,759
[45] Date of Patent: Sep. 8, 1998

[54] OPTICAL EQUALIZER HAVING VARIABLE TRANSMITTANCE VERSUS WAVELENGTH CHARACTERISTICS FOR ATTENUATING LIGHT

[75] Inventor: Nobuhiro Fukushima, Kawasaki, Japan

[73] Assignee: Fujitsu Limited, Kawasaki, Japan

[21] Appl. No.: 785,038

[22] Filed: Jan. 17, 1997

[30] Foreign Application Priority Data

Mar. 27, 1996 [JP] Japan ................................. 8-071821

[51] Int. Cl.$^6$ ....................................................... G02B 6/26
[52] U.S. Cl. ............................ 385/140; 385/37; 385/25; 385/42; 359/889
[58] Field of Search ........................... 385/140, 36, 37, 385/31, 25, 47, 42; 359/889

[56] References Cited

U.S. PATENT DOCUMENTS

| | | | |
|---|---|---|---|
| 4,197,008 | 4/1980 | Pinnow et al. | 356/150 |
| 4,575,193 | 3/1986 | Greivenkamp, Jr. | 350/401 |
| 5,317,661 | 5/1994 | Szentesi et al. | 385/31 |
| 5,481,381 | 1/1996 | Fujimoto | 359/889 |

FOREIGN PATENT DOCUMENTS

| | | |
|---|---|---|
| A-55-59403 | 5/1980 | Japan . |
| A-58-33205 | 2/1983 | Japan . |
| 262619 | 10/1970 | Russian Federation ........... 359/889 |

*Primary Examiner*—John Ngo
*Attorney, Agent, or Firm*—Staas & Halsey

[57] ABSTRACT

An apparatus, such as an optical equalizer, having variable wavelength characteristics. More specifically, the apparatus attenuates an input light, and includes a beam expander, a beam condenser and an attenuator positioned between the beam expander and the beam condenser. The beam expander converts the input light into a spectral beam propagating in a first direction and having wavelength components spatially separated in a second direction perpendicular to the first direction. The attenuator intersects the spectral beam and has a planer distribution of transmittance so that the spectral beam passes through the attenuator and is attenuated in accordance with the planer distribution of transmittance. The beam expander converts the attenuated spectral beam into an output light. The attenuator is movable in a plane which is not parallel to the first direction. For example, the attenuator can be movable in a plane which is substantially perpendicular to the first direction. Further, the attenuator can include a plurality of individual attenuators, wherein each individual attenuator intersects the spectral beam and has a corresponding planer distribution of transmittance for attenuating the spectral beam in accordance with the corresponding planer distribution of transmittance.

58 Claims, 21 Drawing Sheets

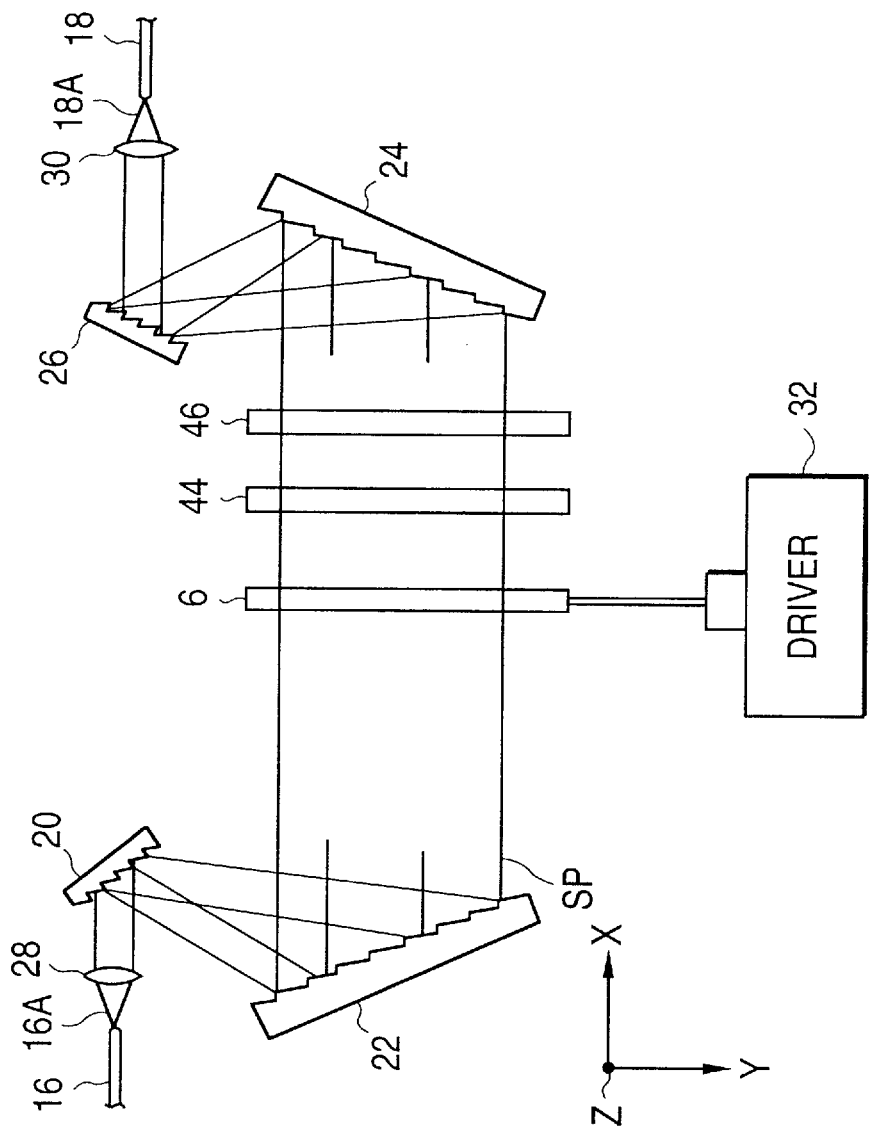

OPTICAL EQUALIZER HAVING VARIABLE TRANSMITTANCE VERSUS WAVELENGTH CHARACTERISTICS FOR ATTENUATING LIGHT

CROSS-REFERENCE TO RELATED APPLICATIONS

This application is based on, and claims priority to, Japanese patent application 08-071821, filed on Mar. 27, 1996, in Japan, and which is incorporated herein by reference.

BACKGROUND OF THE INVENTION

1. Field of the Invention

The present invention relates to an apparatus, such as an optical equalizer, having variable transmittance versus wavelength characteristics for attenuating light.

2. Description of the Related Art

In an optical communication system, a transmitted signal light can include many different wavelength components. For example, in an optical communication system using wavelength division multiplexing (WDM), a plurality of individual signal lights can be multiplexed into a wavelength division multiplexed (WDM) signal light. The WDM signal light would then include a plurality of individual wavelength components corresponding, respectively, to the plurality of individual signal lights. The WDM signal light can then be transmitted through a single optical fiber and demultiplexed at the other end of the optical fiber. The individual signal lights can be detected from the demultiplexed WDM signal light. In this manner, the transmission speed and capacity of the optical communication can be increased.

Moreover, it is often desirable to attenuate different wavelength components of light by different attenuation factors. For example, in the above-described optical communication system, an erbium doped fiber amplifier (EDFA) is typically used to amplify the WDM signal light. Generally, such an EDFA produces pump light which amplifies the WDM signal light as the WDM signal light travels through the EDFA. However, an EDFA typically has a gain tilt depending on the power of the pump light, where different wavelength components experience different gain. For example, when the power of the pump light is relatively high, the EDFA may produce a negative gain tilt, where higher wavelength components in the WDM signal light are amplified less than lower wavelength components in the WDM signal light. Similarly, when the power of the pump light is relatively low, the EDFA may produce a positive gain tilt, where higher wavelength components in the WDM signal light are amplified more than lower wavelength components in the WDM signal light. Thus, the gain tilt of an EDFA may not be flat.

Therefore, when an EDFA is used in an optical communication system, it is may be desirable to attenuate various wavelength components of the WDM signal light with different attenuation factors, to obtain a flat gain tilt. There are many other situations where it is desireable to attenuate various wavelength components of a signal light with different attenuation factors.

An optical filter having wavelength characteristics which oppose the wavelength characteristics of an EDFA can be used to obtain a flat gain tilt. Moreover, since the gain characteristics of an EDFA and the wavelength of signal light change in accordance with the operating conditions of the optical communication system, it is desirable for an optical filter to be "tunable", that is, to have variable wavelength characteristics. Such a tunable optical filter is typically referred to as an "optical equalizer". Tunable optical filters, or optical equalizers, are disclosed, for example, in Japanese Patent Laid-Open No. Sho 54-92766 (U.S. Pat. No. 4,197,008), Japanese Patent Laid-Open No. Sho 61-501798 (U.S. Pat. No. 4,575,193) and Japanese Patent Application No. Hei 7-214732.

Unfortunately, in a tunable optical filter, it is difficult to provide a simple, easy-to-adjust correspondence between a characteristic of the optical filter to be adjusted and the desired wavelength characteristics of the optical filter.

Instead of a tunable optical filter, a conventional optical attenuator can be used as an optical equalizer, to attenuate different wavelength components of signal light. However, it is often desirable to attenuate the signal light in accordance with arbitrary shaped wavelength characteristics. Unfortunately, a conventional optical attenuator is generally not capable of providing arbitrary shaped, changeable wavelength characteristics.

SUMMARY OF THE INVENTION

It is therefore an object of the present invention to provide an apparatus, such as an optical equalizer, which can obtain variable wavelength characteristics and has a simple correspondence between a factor of the apparatus to be adjusted and the wavelength characteristics to be obtained.

It is an additional object of the present invention to provide an apparatus, such as an optical equalizer, which can obtain arbitrary shaped wavelength characteristics.

Additional objects and advantages of the invention will be set forth in part in the description which follows, and, in part, will be obvious from the description, or may be learned by practice of the invention.

Objects of the present invention are achieved by providing an apparatus which attenuates a spectral beam propagating in a first direction and having wavelength components spatially separated in a second direction perpendicular to the first direction. The apparatus includes an attenuator intersecting the spectral beam and having a planer distribution of transmittance in a first plane which is not parallel to the first direction so that the spectral beam passes through the attenuator and is attenuated in accordance with the planer distribution of transmittance. The attenuator is movable in a second plane which is not parallel to the first direction. For example, the first and second planes may be the same and may be perpendicular to the first direction.

Objects of the present invention are also achieved by providing an apparatus for attenuating an input light, wherein the apparatus includes first and second converters, and an attenuator positioned between the first and second converters. The first converter converts the input light into a spectral beam propagating in a first direction and having wavelength components spatially separated in a second direction perpendicular to the first direction. The attenuator intersects the spectral beam and has a planer distribution of transmittance so that the spectral beam passes through the attenuator and is attenuated in accordance with the planer distribution of transmittance. The second converter converts the attenuated spectral beam into an output light. The attenuator is movable in a plane which is not parallel to the first direction. For example, the attenuator can be movable in a plane which is substantially perpendicular to the first direction. Further, the attenuator can include a plurality of individual attenuators, wherein each individual attenuator intersects the spectral beam and has a corresponding planer distribution of transmittance for attenuating the spectral beam in accordance with the corresponding planer distribution of transmittance.

BRIEF DESCRIPTION OF THE DRAWINGS

These and other objects and advantages of the invention will become apparent and more readily appreciated from the following description of the preferred embodiments, taken in conjunction with the accompanying drawings, of which:

FIG. 8 is a diagram illustrating an optical equalizer, according to an additional embodiment of the present invention.

DETAILED DESCRIPTION OF THE PREFERRED EMBODIMENTS

Figure 1:
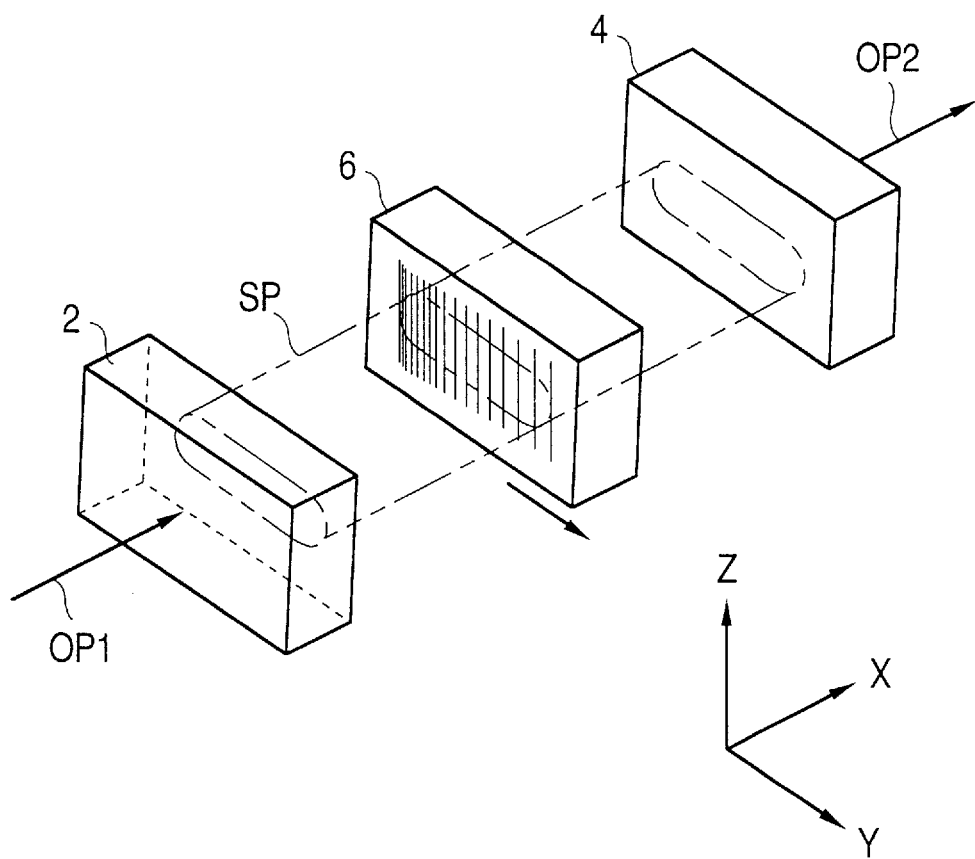
FIG. 1 is a diagram illustrating an optical equalizer, according to an embodiment of the present invention.

Reference will now be made in detail to the preferred embodiments of the present invention, examples of which are illustrated in the accompanying drawings, wherein like reference numerals refer to the same or similar elements throughout.

FIG. 1 is a diagram illustrating an optical equalizer, according to an embodiment of the present invention. Referring now to FIG. 1, a beam splitter 2 receives an input light travelling along a first optical path OP1 and converts input light into a spectral beam SP. The wavelength components of spectral beam SP are separated spatially in a direction of thickness of spectral beam SP. That is, the wavelength components of spectral beam SP are separated spatially in the Y direction illustrated in FIG. 1. Moreover, the spectral beam SP propagates in the X direction illustrated in FIG. 1, where the X direction is perpendicular to the Y direction. FIG. 1 also illustrates a Z direction which is perpendicular to both the X direction and the Y direction. Hereinafter, with regard to the various figures described herein, the X direction, Y direction and Z direction may also be referred to as the X axis, Y axis and Z axis, respectively.

A beam condenser 4 converts spectral beam SP into an output light and provides the output light to a second optical path OP2. Therefore, beam expander 2 can be referred to as a "converter" which converts the input light into a spectral beam, and beam condenser 4 can be referred to as a "converter" which converts the spectral beam into an output light. Thus, the input light and the output light are generally not spectral beams, or at least have different characteristics than spectral beam SP. Otherwise, if the input light and/or the output light have exactly the same characteristics as spectral beam SP, there is no need for the use of a converter.

A cross section of spectral beam SP can be, for example, elliptical or rectangular. Also, spectral beam SP is illustrated as a collimated beam, but is not intended to be limited to being a collimated beam. That is, by suitably combining various lenses (not illustrated), a spectral beam having a shape different from the shape of a collimated beam may be obtained. However, spectral beam SP should have wavelength components separated spatially in a direction (such as the Y direction) which is perpendicular to the propagation direction (such as the X direction) of spectral beam SP.

An attenuator plate 6 intersects spectral beam SP, and has a planar distribution of transmittance for attenuating spectral beam SP. Moreover, attenuator plate 6 is movable in a YZ plane. The movement of attenuator plate 6 in the YZ plane includes displacement along the Y direction and the Z direction, rotation about the X direction as an axis, and a combination of such displacement and rotation.

In the following description, the direction of increase in wavelength of wavelength components of spectral beam SP will be assumed as a positive direction of the Y axis.

Figure 2A:
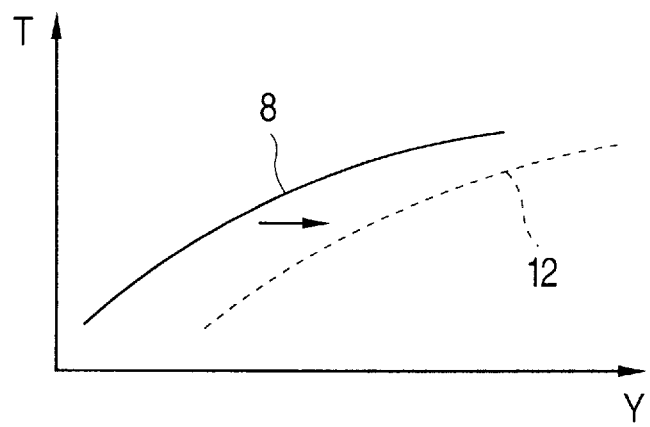
FIGS. 2(A) and 2(B) are graphs illustrating transmittance characteristics of the optical equalizer illustrated in FIG. 1, according to an embodiment of the present invention.
Figure 2B:
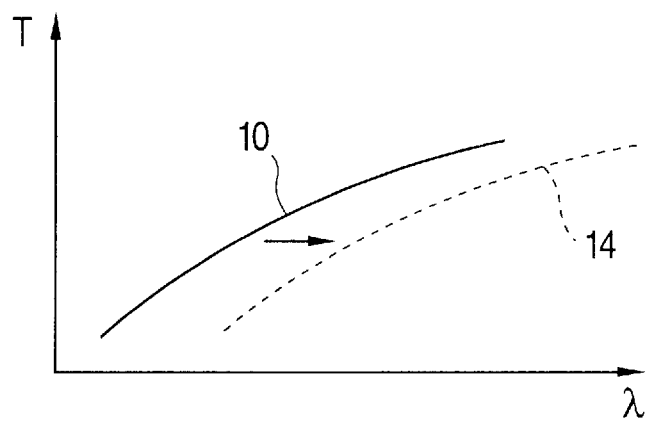

FIGS. 2(A) and 2(B) are graphs illustrating transmittance characteristics of the optical equalizer illustrated in FIG. 1, according to an embodiment of the present invention. Referring now to FIGS. 2(A) and 2(B), assuming that the transmittance T of attenuator plate 6 continuously increases along the Y axis as shown by a curve 8 in FIG. 2(A), then the Y coordinate can be converted into wavelength according to the property of spectral beam SP to obtain wavelength characteristics of the optical equalizer as shown by curve 10 in FIG. 2(B). In this case, the wavelength characteristics obtained are such that the transmittance T continuously increases with an increase in wavelength λ (see curve 10 in FIG. 2(B)) in correspondence with the transmittance distribution on the Y axis (see curve 8 in FIG. 2(A)).

Assuming that attenuator plate 6 is displaced in the positive direction of the Y axis in FIG. 1, the transmittance distribution 8 is moved in parallel in the direction of the Y axis as shown by curve 12 in FIG. 2(A). With this parallel movement, the wavelength characteristics of the optical equalizer as illustrated by curve 10 are moved in parallel in a direction of increase in wavelength λ as shown by curve 14 in FIG. 2(B).

In this manner, the wavelength characteristics of the optical equalizer illustrated in FIG. 1 can be changed by moving attenuator plate 6. Further, as described with reference to FIGS. 2(A) and 2(B), there holds a simple correspondence between a factor to be adjusted (that is, the position of attenuator plate 6) and wavelength characteristics to be obtained.

Figure 3:
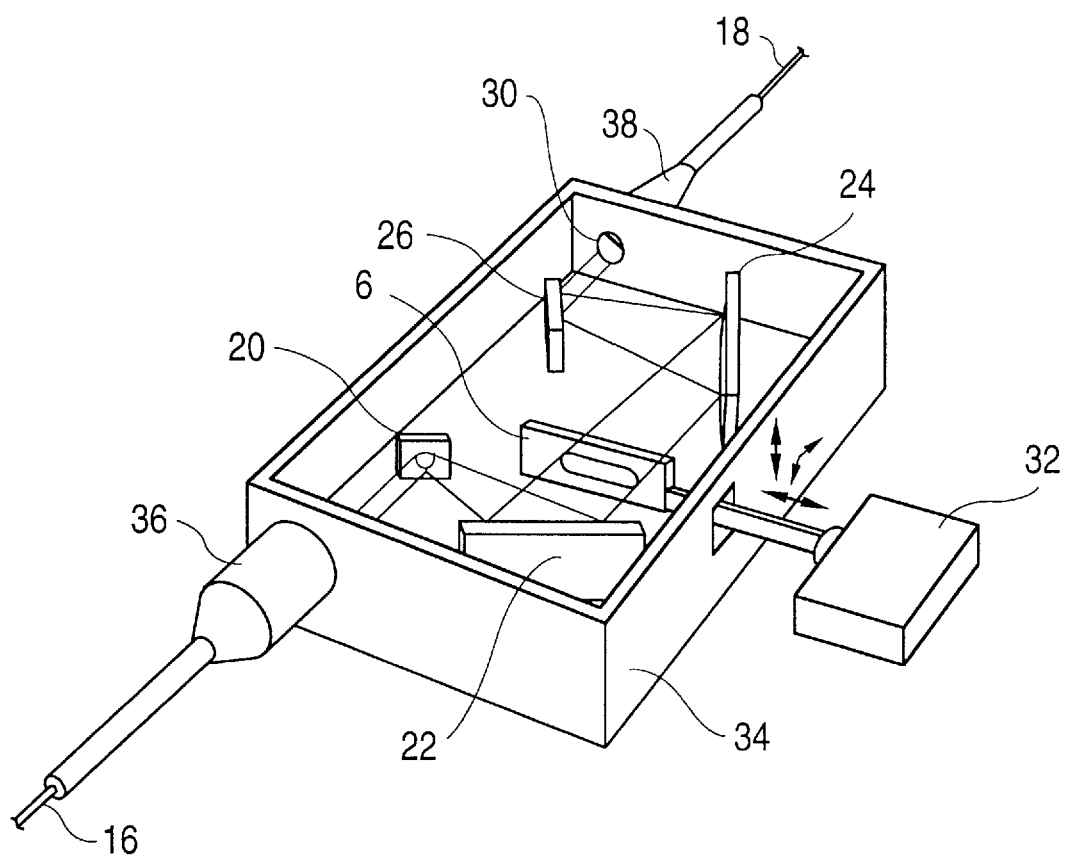
FIG. 3 is a diagram illustrating a perspective view of an optical equalizer, according to an embodiment of the present invention.
Figure 4:
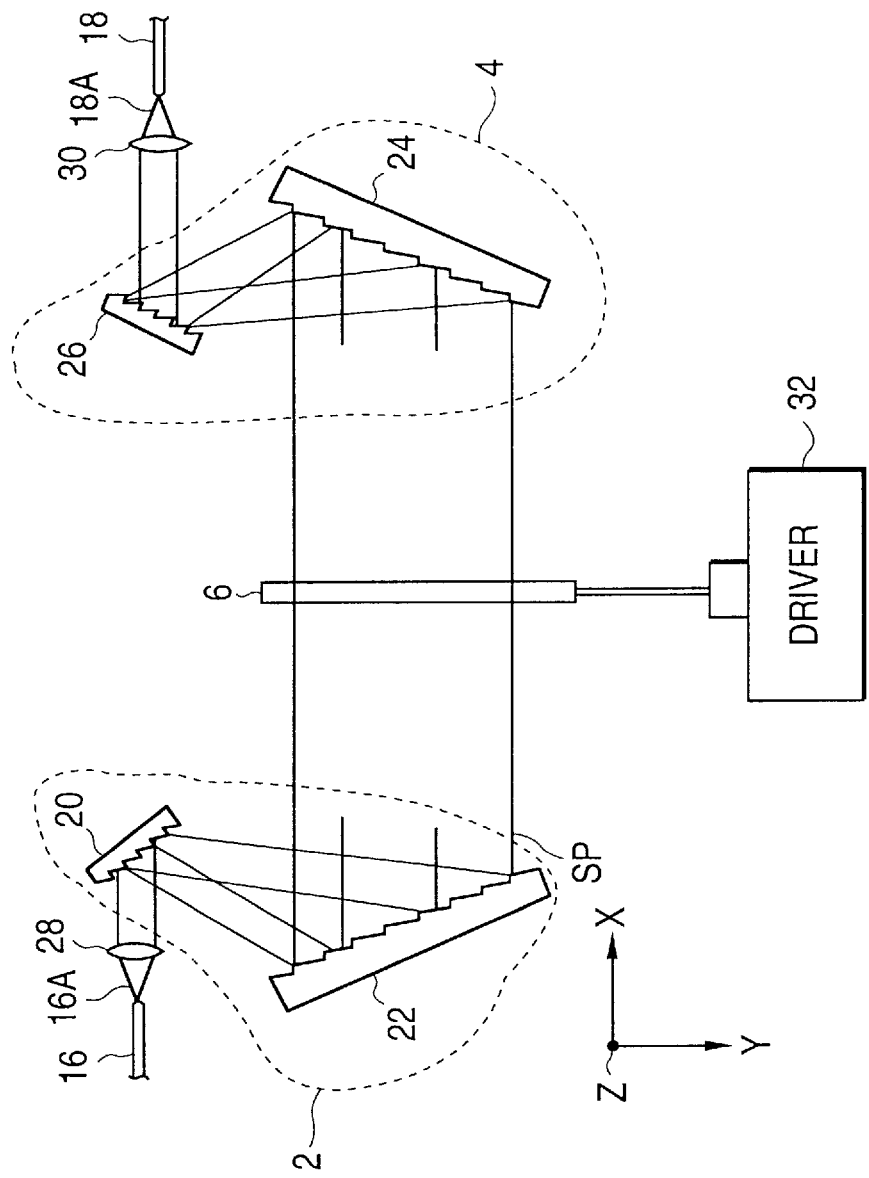
FIG. 4 is a diagram illustrating various components of the optical equalizer illustrated in FIG. 3, according to an embodiment of the present invention.

FIGS. 3 and 4 are diagrams illustrating an optical equalizer, according to an embodiment of the present invention. Referring now to FIGS. 3 and 4, optical fiber 16 corresponds to first optical path OP1 (see FIG. 1) and optical fiber 18 corresponds to second optical path OP2 (see FIG. 1). Optical fibers 16 and 18 have excitation ends 16A and 18A, respectively.

Beam expander 2 (see FIG. 1) includes first and second diffraction gratings 20 and 22 located operatively with respect to excitation end 16A, and beam condenser 4 (see FIG. 1) includes third and fourth diffraction gratings 24 and 26 located operatively with respect to excitation end 18A. With this arrangement, spectral beam SP is formed between second and third diffraction gratings 22 and 24. Although diffraction gratings 20, 22, 24 and 26 are shown as being reflection type diffraction gratings, transmission type diffraction gratings may be used. Further, other light dispersing elements, such as a prism, may be used as beam expander 2 and beam condenser 4.

Lenses 28 and 30 oppose excitation ends 16A and 18A, respectively, to form a collimated beam system. In the present embodiment of the present invention, the grating constant of first diffraction grating 20 is equal to that of second diffraction grating 22, and the grating constant of third diffraction grating 24 is equal to that of fourth diffraction grating 26. By setting the grating constants in this manner, and the use of lenses 28 and 30, spectral beam SP can be a collimated beam.

Moreover, by setting the grating constant of first and second diffraction gratings 20 and 22 equal to the grating constants of third and fourth diffraction gratings 24 and 26, first and second diffraction gratings 20 and 22 can be located in symmetrical relationship with third and fourth diffraction gratings 24 and 26. Further, by giving the same blaze angle to each diffraction grating, insertion loss of the optical equalizer can be reduced.

A driver 32 moves and positions attenuator plate 6 in the YZ plane. Driver 32 includes a mechanism (not illustrated) for displacing attenuator plate 6 along the Y axis and the Z axis, and a mechanism (not illustrated) for rotating attenuator plate 6 about the X axis. The direction of displacement of attenuator plate 6 or the selection of displacement or rotation of attenuator plate 6 is determined in accordance with a transmittance distribution and desired wavelength characteristics of attenuator plate 6. Various embodiments of the present invention using different types of is attenuator plates in different positions will be described in more detail further below.

Light emerging from excitation end 16A is converted into a collimated beam by lens 28. At this time, the wavelength components of this collimated beam are not separated spatially both along the Y axis and along the Z axis. The collimated beam from lens 28 is diffracted by first diffraction grating 20 at different angles corresponding to the wavelength components of the collimated beam. In the present embodiment of the present invention, the longer the wavelength of the input light, the larger the diffraction angle.

The diffracted light from first diffraction grating 20 is further diffracted by second diffraction grating 22, thereby obtaining spectral beam SP. Since the grating constants of diffraction gratings 20 and 22 are equal to each other, spectral beam SP is formed as a beam of parallel rays. Moreover, the gratings of diffraction gratings 20 and 22 are parallel to the Z axis. Accordingly, the wavelength components of spectral beam SP are separated spatially along the Y axis.

When passing through attenuator plate 6, the wavelength components of spectral beam SP are subjected to different attenuations according to the distribution of the attenuation factor of attenuator plate 6.

The gratings of third and fourth diffraction gratings 24 and 26 are also parallel to the Z axis. Spectral beam SP passed through attenuator plate 6 is diffracted by diffraction gratings 24 and 26, in this order, to again become a collimated beam. At this time, the wavelength components of this collimated beam are not separated spatially both along the Y axis and along the Z axis. The collimated beam from diffraction grating 26 is converged by lens 30 to enter optical fiber 18 from excitation end 18A.

As shown in FIG. 3, diffraction gratings 20, 22, 24 and 26 are fixed in a housing 34. Housing 34 has a cover which is not illustrated in FIG. 3 so that the components inside housing 34 can be easily seen.

Optical fiber 16 and lens 28 are held by a fiber collimator 36 so that excitation end 16A and lens 28 are in a predetermined relative positional relation. Similarly, optical fiber 18 and lens 30 are held by a fiber collimator 3G. Fiber collimators 36 and 38 are fixed to housing 34 so as to cover openings formed through opposite side walls of housing 34, thereby providing an optical interface between the inside and the outside of housing 34.

Therefore, according to the above embodiments of the present invention, an apparatus (such as an optical equalizer) attenuates an input light. The apparatus includes first and second converters and an attenuator positioned between the first and second converters. The first converter (see, for example, beam expander 2 in FIG. 1) converts the input light into a spectral beam propagating in a first direction (see, for example, the X direction in FIG. 1) and having wavelength components spatially separated in a second direction (see, for example, the Y direction in FIG. 1) perpendicular to the first direction. An attenuator (see, for example, attenuator plate 6 in FIG. 1) intersects the spectral beam and has a planer distribution of transmittance so that the spectral beam passes through the attenuator and is attenuated in accordance with the planer distribution of transmittance. The second converter (see, for example, beam condenser 4 in FIG. 1) converts the attenuated spectral beam into an output light.

Figure 5A:
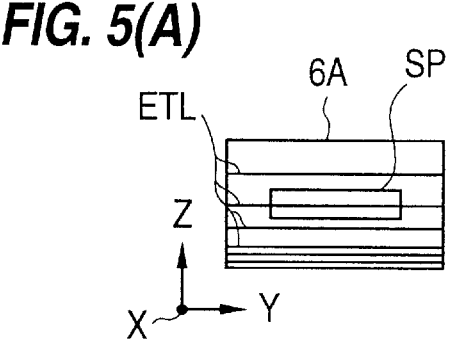
FIG. 5(A) is a perspective view of an attenuator plate of an optical equalizer, according to an embodiment of the present invention.
Figure 5B:
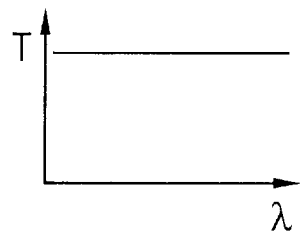
FIG. 5(B) is a graph illustrating transmission versus wavelength characteristics of an optical equalizer using the attenuator plate illustrated in FIG. 5(A), according to an embodiment of the present invention.

FIG. 5(A) is a perspective view of an attenuator plate 6A, according to an embodiment of the present invention, and FIG. 5(B) is a graph illustrating transmission versus wavelength characteristics of the optical equalizer illustrated in FIGS. 3 and 4 using attenuator plate 6A, according to an embodiment of the present invention.

Referring now to FIG. 5(A), attenuator plate 6A has a transmittance distribution such that the transmittance simply changes along the Z axis. More specifically, a plurality of equitransmittance lines ETL in attenuator plate 6A are each provided as a collection of points giving equal transmittance. Each equitransmittance line ETL is a straight line which is parallel to the Y axis. A portion of attenuator plate 6A intersecting spectral beam SP is shown as a rectangle in FIG. 5(A). The length of this rectangle along the Y axis is the width of spectral beam SP.

The attenuation factor of attenuator plate 6A increases towards the lower side in FIG. 5(A) of attenuation plate 6a. That is, the attenuation factor increases in the negative direction of the Z axis. Such a transmittance distribution in attenuator plate 6A can be obtained, for example, using vapor deposition to form a metal film on a glass plate, where the metal film has a gradually decreasing thickness by vapor deposition.

In the positional condition of attenuator plate 6A shown in FIG. 5(A), the transmittance does not change along the Y axis. Accordingly, wavelength characteristics are constant, as shown in FIG. 5(B). In this manner, even when attenuator plate 6A is displaced along the Y axis, the wavelength characteristics do not change. However, when attenuator plate 6A is displaced along the Z axis, the wavelength characteristics shown in FIG. 5(B) vertically change. That is, when attenuator plate 6A is displaced in the positive direction of the Z axis, the transmittance decreases. By contrast, when attenuator plate 6A is displaced in the negative direction of the Z axis, the transmittance increases. Accordingly, an optical equalizer using attenuator plate 6A functions as a variable optical attenuator.

Figure 5C:
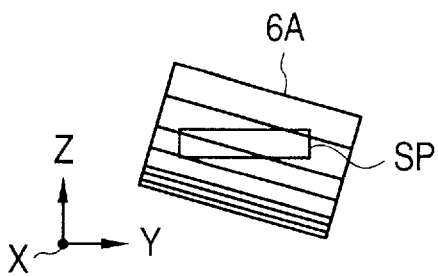
FIG. 5(C) is a perspective view of an attenuator plate of an optical equalizer, according to an embodiment of the present invention.
Figure 5D:
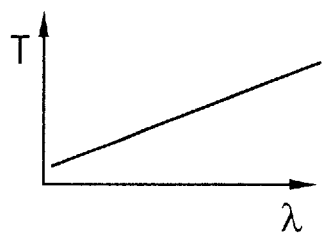
FIG. 5(D) is a graph illustrating transmission versus wavelength characteristics of an optical equalizer using the attenuator plate illustrated in FIG. 5(C), according to an embodiment of the present invention.

When attenuator plate 6A is rotated clockwise in the YZ plane with respect to the propagation direction of spectral beam (that is, the positive direction of the X axis) as shown in FIG. 5(C), the wavelength characteristics change to those as shown in FIG. 5(D) such that the transmittance T increases with an increase in wavelength $\lambda$. The gradient of the wavelength characteristics is increased by increasing the rotational angle of attenuator plate 6A within 90°.

Figure 5E:
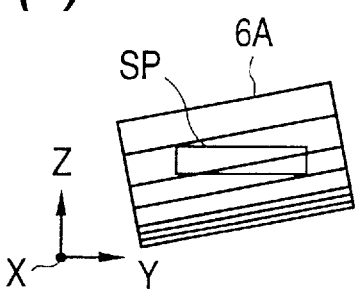
FIG. 5(E) is a perspective view of an attenuator plate of an optical equalizer, according to an embodiment of the present invention.
Figure 5F:
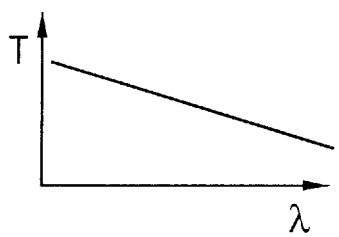
FIG. 5(F) is a graph illustrating transmission versus wavelength characteristics of an optical equalizer using the attenuator plate illustrated in FIG. 5(E), according to an embodiment of the present invention.

Conversely, when attenuator plate 6A is rotated counterclockwise as shown in FIG. 5(E), the wavelength characteristics change to those as shown in FIG. 5(F) such that the transmittance T decreases with an increase in wavelength $\lambda$.

Figure 6A:
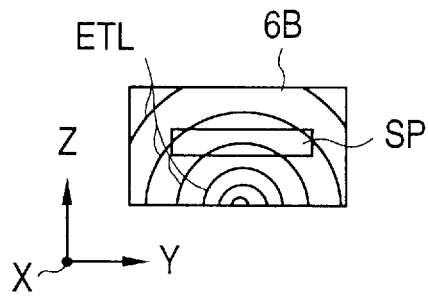
FIG. 6(A) is a perspective view of an attenuator plate of an optical equalizer, according to an embodiment of the present invention.
Figure 6B:
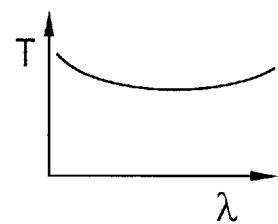
FIG. 6(B) is a graph illustrating transmission versus wavelength characteristics of an optical equalizer using the attenuator plate illustrated in FIG. 6(A), according to an embodiment of the present invention.

FIG. 6(A) is a perspective view of an attenuator plate 6B, according to an embodiment of the present invention, and FIG. 6(B) is a graph illustrating transmission versus wavelength characteristics of the optical equalizer illustrated in FIGS. 3 and 4 using attenuator plate 6B, according to an embodiment of the present invention.

Referring now to FIGS. 6(A), attenuator plate 6B includes a plurality of equitransmittance lines ETL concentrical arranged with respect to each other. The minimum value of transmittance is, for example, at the center of the concentric equitransmittance lines ETL.

In the positional condition shown in FIG. 6(A), the center of the concentric equitransmittance lines ETL corresponds substantially to the center of spectral beam SP in the direction of the Y axis. Accordingly, wavelength characteristics providing a minimum value of transmittances as shown in FIG. 6(B) are obtained.

Figure 6C:
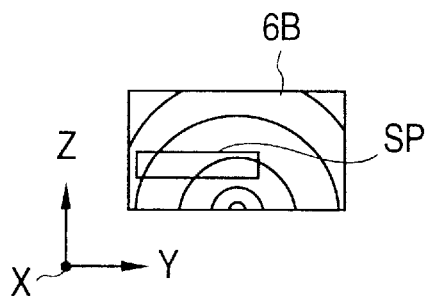
FIG. 6(C) is a perspective view of an attenuator plate of an optical equalizer, according to an embodiment of the present invention.
Figure 6D:
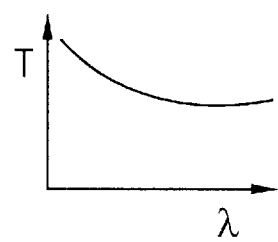
FIG. 6(D) is a graph illustrating transmission versus wavelength characteristics of an optical equalizer using the attenuator plate illustrated in FIG. 6(C), according to an embodiment of the present invention.

When attenuator plate 6B is displaced in the positive direction of the Y axis as shown in FIG. 6(C), the wavelength characteristics providing the minimum value of transmittances are shifted to longer wavelengths, as shown in FIG. 6(D). Although not shown, when the center of the attenuation factor distribution of attenuator plate 6B (the point giving the minimum transmittance) comes away from spectral beam SP in the direction of the Y axis, the wavelength characteristics change to those such that the transmittance T monotonically increases or decreases with an increase in wavelength λ.

Figure 6E:
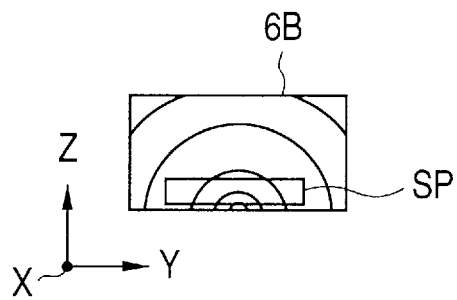
FIG. 6(E) is a perspective view of an attenuator plate of an optical equalizer, according to an embodiment of the present invention.
Figure 6F:
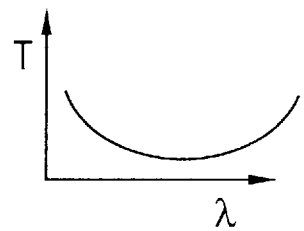
FIG. 6(F) is a graph illustrating transmission versus wavelength characteristics of an optical equalizer using the attenuator plate illustrated in FIG. 6(E) according to an embodiment of the present invention.

When attenuator plate 6B is displaced in the positive direction of the Z axis from the positional condition shown in FIG. 6(A) to the positional condition shown in FIG. 6(E), the wavelength characteristics change to those as shown in FIG. 6(F). More specifically, the curve shown in FIG. 6(B) is lowered as a whole and the curvature of the curve is increased, as shown in FIG. 6(F).

Figure 7A:
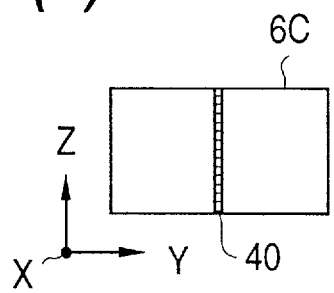
FIG. 7(A) is a perspective view of an attenuator plate of an optical equalizer, according to an embodiment of the present invention.
Figure 7B:
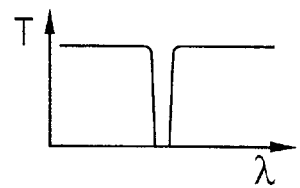
FIG. 7(B) is a graph illustrating transmission versus wavelength characteristics of an optical equalizer using the attenuator plate illustrated in FIG. 7(A), according to an embodiment of the present invention.

FIG. 7(A) is a perspective view of an attenuator plate 6C, according to an embodiment of the present invention, and FIG. 7(B) is a graph illustrating transmission versus wavelength characteristics of the optical equalizer illustrated in FIGS. 3 and 4 using attenuator plate 6C, according to an embodiment of the present invention.

Referring now to FIG. 7(A), attenuator plate 6C has a blocking stripe 40 extending along the Z axis. Blocking stripe 40 is formed, for example, by a metal thin film. The transmittance on blocking stripe 40 is, in principle, 0%, and the transmittance on a portion other than blocking stripe 40 is, in principle, 100%.

By using attenuator plate 6C, wavelength characteristics of optical band rejection as shown in FIG. 7(B) are obtained. The center wavelength in a rejection band of attenuator plate 6C can be changed by displacing attenuator plate 6C along the Y axis.

Figure 7C:
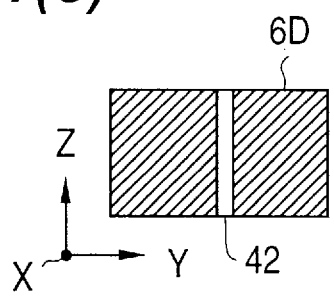
FIG. 7(C) is a perspective view of an attenuator plate of an optical equalizer, according to an embodiment of the present invention.
Figure 7D:
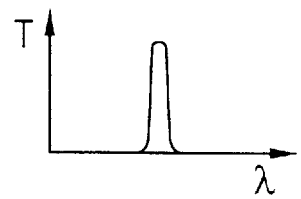
FIG. 7(D) is a graph illustrating transmission versus wavelength characteristics of an optical equalizer using the attenuator plate illustrated in FIG. 7(C), according to an embodiment of the present invention.

FIG. 7(C) is a perspective view of an attenuator plate 6D, according to an embodiment of the present invention, and FIG. 7(D) is a graph illustrating transmission versus wavelength characteristics of the optical equalizer illustrated in FIGS. 3 and 4 using attenuator plate 6D, according to an embodiment of the present invention.

Referring now to FIG. 7(C), attenuator plate 6D has a transmitting stripe (slit) 42 extending along the Z axis. The transmittance on transmitting stripe 42 is, in principle, 100%, and the transmittance on a portion other than the transmitting stripe 42 is, in principle, 0%. By using attenuator plate 6D, wavelength characteristics of optical band pass as shown in FIG. 7(D) are obtained. The center wavelength in a pass band of attenuator plate 6D can be changed by displacing the attenuator plate 6D along the Y axis.

Figure 7E:
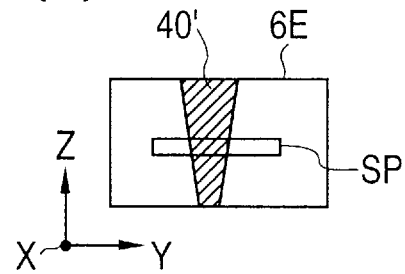
FIG. 7(E) is a perspective view of an attenuator plate of an optical equalizer, according to an embodiment of the present invention.
Figure 7F:
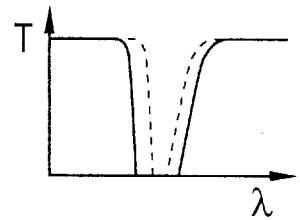
FIG. 7(F) is a graph illustrating transmission versus wavelength characteristics of an optical equalizer using the attenuator plate illustrated in FIG. 7(E), according to an embodiment of the present invention.

FIG. 7(E) is a perspective view of an attenuator plate 6E, according to an embodiment of the present invention, and FIG. 7(F) is a graph illustrating transmission versus wavelength characteristics of the optical equalizer illustrated in FIGS. 3 and 4 using attenuator plate 6E, according to an embodiment of the present invention.

Referring now to FIG. 7(E), attenuator plate 6E has a blocking stripe 40' having a changing width in the YZ plane. By displacing attenuator plate 6E along the Z axis, the area of a portion of the blocking stripe 40' intersecting spectral beam SP can be changed. Accordingly, the width of a rejection band of attenuator plate 6E can be changed as shown in FIG. 7(F). Further, as with attenuator plate 6C, the center wavelength of the rejection band can be changed by displacing attenuator plate 6E along the Y axis.

When attenuator plate 6E is displaced in the positive direction of the Y axis, the center wavelength of the rejection band is shifted to longer wavelengths, whereas when attenuator plate 6E is displaced in the negative direction of the Y axis, the center wavelength of the rejection band is shifted to shorter wavelengths.

Although not shown, the width of transmitting stripe 42 illustrated in FIG. 7(C) may be change in the YZ plane, as with blocking stripe 40', thereby allowing a change in width of the pass band.

In each of the above embodiments of the present invention, there is a relatively simple correspondence between a factor to be adjusted (that is, the position of an attenuating plate) and wavelength characteristics to be obtained. Accordingly, desired wavelength characteristics can be easily obtained.

FIG. 8 is a diagram illustrating an optical equalizer, according to an additional embodiment of the present invention. In contrast with the embodiment of the present invention illustrated in FIG. 4, the embodiment of the present invention illustrated in FIG. 8 includes a half-wave plate 44 and a compensator plate 46 between attenuator plate 6 and third diffraction grating 24 so as to intersect spectral beam SP. Moreover, any one or both of half-wave plate 44 and compensator plate 46 may be provided between second diffraction grating 22 and attenuator plate 6.

In the case that spectral beam SP is linearly polarized light, half-wave plate 44 functions as an optical rotating element for rotating a plane of polarization of spectral beam SP by 90°. To provide the 90° rotation, the principle axis (optic axis) of half-wave plate 44 is inclined 45° with respect to the Y axis and the Z axis.

Such an optical rotating element is used for the following reason. In general, the diffraction efficiency of a diffraction grating has slight polarization dependence. Particularly as in the embodiments of the present invention employing four different diffraction gratings (that is, first, second, third and fourth diffraction gratings 20, 22, 24 and 26, respectively) the polarization dependence is accumulated. To mutually cancel the polarization dependence occurred in first and second diffraction gratings 20 and 22 and the polarization dependence occurred in third and fourth diffraction gratings 24 and 26, half-wave plate 44 is inserted in the path of spectral beam SP.

Compensator plate 46 has a transmittance distribution such that it cancels the wavelength characteristics in diffraction gratings 20, 22, 24 and 26. That is, for example, in the case that each diffraction grating itself has wavelength characteristics, there is a possibility that flat wavelength characteristics as shown in FIG. 5(B) cannot be obtained even though attenuator plate 6A shown in FIG. 5(A) is used. To compensate for this possibility, compensator plate 46 is provided so as to intersect spectral beam SP.

Therefore, compensator plate 46 can be defined as a "compensator" which intersects the spectral beam and has a distribution of transmittance which cancels characteristic effects in the system. However, such a compensator is not intended to be limited to a "plate" shape. Instead, the compensator can be virtually any shape as long as it has an appropriate distribution of transmittance which provides an appropriate effect.

Figure 9:
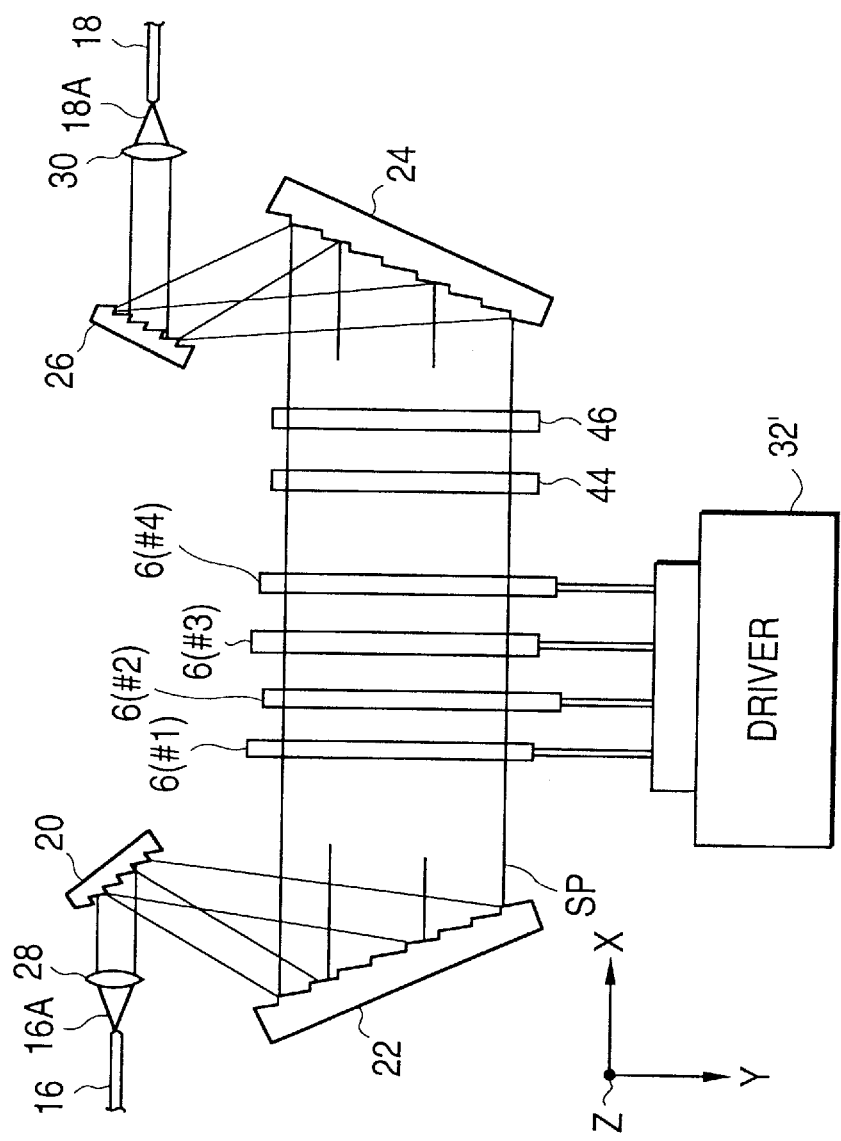
FIG. 9 is a diagram illustrating an optical equalizer, according to a further embodiment of the present invention.

FIG. 9 is a diagram illustrating an optical equalizer, according to a further embodiment of the present invention. In contrast with the embodiment of the present invention illustrated in FIG. 8, the embodiment of the present invention illustrated in FIG. 9 includes four individual attenuator plates 6 (#1 to #4). However, the number of the attenuator plates is not intended to be limited to four, and virtually any number of attenuating plates can be used. Moreover, an improved driver 32' is used to individually move and position attenuator plates 6 (#1 to #4) in the YZ plane.

Therefore, as illustrated in FIG. 9, an attenuator can be defined as including a plurality of individual attenuators (for example, attenuator plates 6 (#1 to #4), where each individual attenuator intersects the spectral beam and has a planer distribution of transmittance.

Figure 10A:
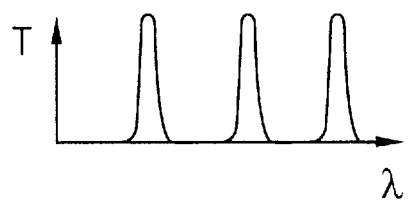
FIGS. 10(A), 10(B) and 10(C) are graphs illustrating examples of characteristics of the optical equalizer illustrated in FIG. 9, according to embodiments of the present invention.
Figure 10B:
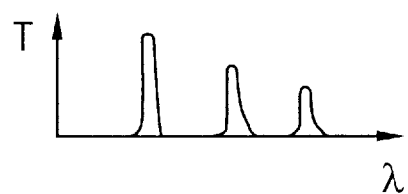
Figure 10C:
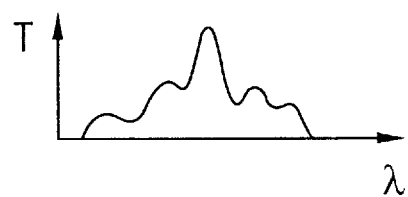

FIGS. 10(A), 10(B) and 10(C) are graphs illustrating examples of characteristics of the optical equalizer illustrated in FIG. 9, according to embodiments of the present invention. The wavelength characteristics shown in FIG. 10(A) are obtained in the case that attenuator plate 6 (#4) is displaced along the Z axis so as not to intersect spectral beam SP, and each of the other attenuator plates 6 (#1 to #3) are adjusted so that the three peaks are arranged at equal intervals along the wavelength axis, thereby setting the center wavelength in each pass band. By using such an optical equalizer, for example, a plurality of channels of signal light can be selected in a receiving station of a WDM optical communication system, and background noise light can be removed, thereby improving the signal-to-noise ratio.

As another example, the spectrum peaks in the plural channels can be weighted as shown in FIG. 10 (B) by using attenuator plate 6A as shown in FIG. 5(E) as the attenuator plate 6 (#4) and superimposing the wavelength characteristics shown in FIG. 5(F) on the wavelength characteristics shown in FIG. 10(A).

Further, by superimposing proper arbitrary wavelength characteristics on each other, desired arbitrary wavelength characteristics as shown in FIG. 10(C) can be obtained. In this manner, arbitrary shaped wavelength characteristics can be obtained by using a plurality of attenuator plates.

FIGS. 11(A), 11(B), 11(C), 11(D) and 11(E) are graphs illustrating an additional example of characteristics of the optical equalizer illustrated in FIG. 9, according to embodiments of the present invention. More specifically, FIGS. 11(A), 11(B), 11(C) and 11(D) show Y-axis distributions of transmittances of attenuator plates 6 (#1 to #4), respectively. In each distribution, the transmittance T (shown by a logarithmic scale) periodically changes in the direction of the Y axis, and different periods of change are given to attenuator plates 6 (#1 to #4). That is, each attenuator plate 6 (#1 to #4) has a different period of change from the other attenuator plates. For example, the periods of change in the distributions of attenuation factors of attenuator plates 6 (#1 to #4) are set to 0.5, 1, 2, and 3 times the width (Y-axis length) of spectral beam SP, respectively.

Figure 11A:
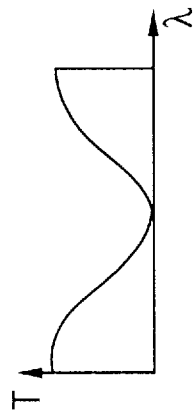
FIGS. 11(A), 11(B), 11(C), 11(D) and 11(E) are graphs illustrating additional examples of characteristics of the optical equalizer illustrated in FIG. 9, according to embodiments of the present invention.
Figure 11B:
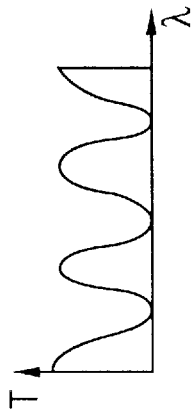
Figure 11C:
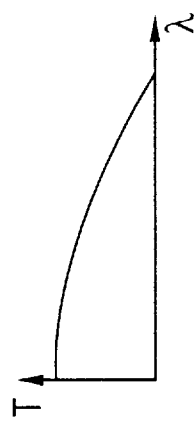
Figure 11D:
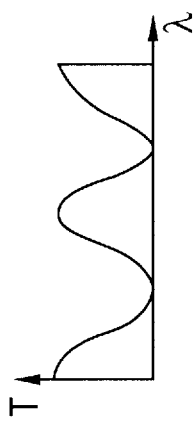
Figure 11E:
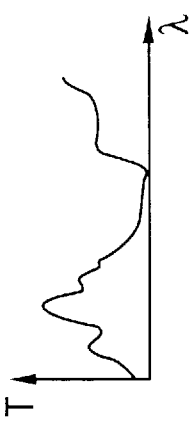

By suitably adjusting the Y coordinates of attenuator plates 6 (#1 to #4), it is possible to obtain arbitrary wavelength characteristics as shown in FIG. 11(E) such that the transmittance T continuously changes with an increase in wavelength λ.

In general, characteristics such that transmittance continuously changes in a limited wavelength range can be expressed by superimposition of a finite number of sine curves (logarithms of sine functions in this case) in accordance with the principle of Fourier series. Practically, it is sufficient to use three or four attenuator plates, so as to make the gain characteristics of an optical amplifier flat, for example.

Figure 12:
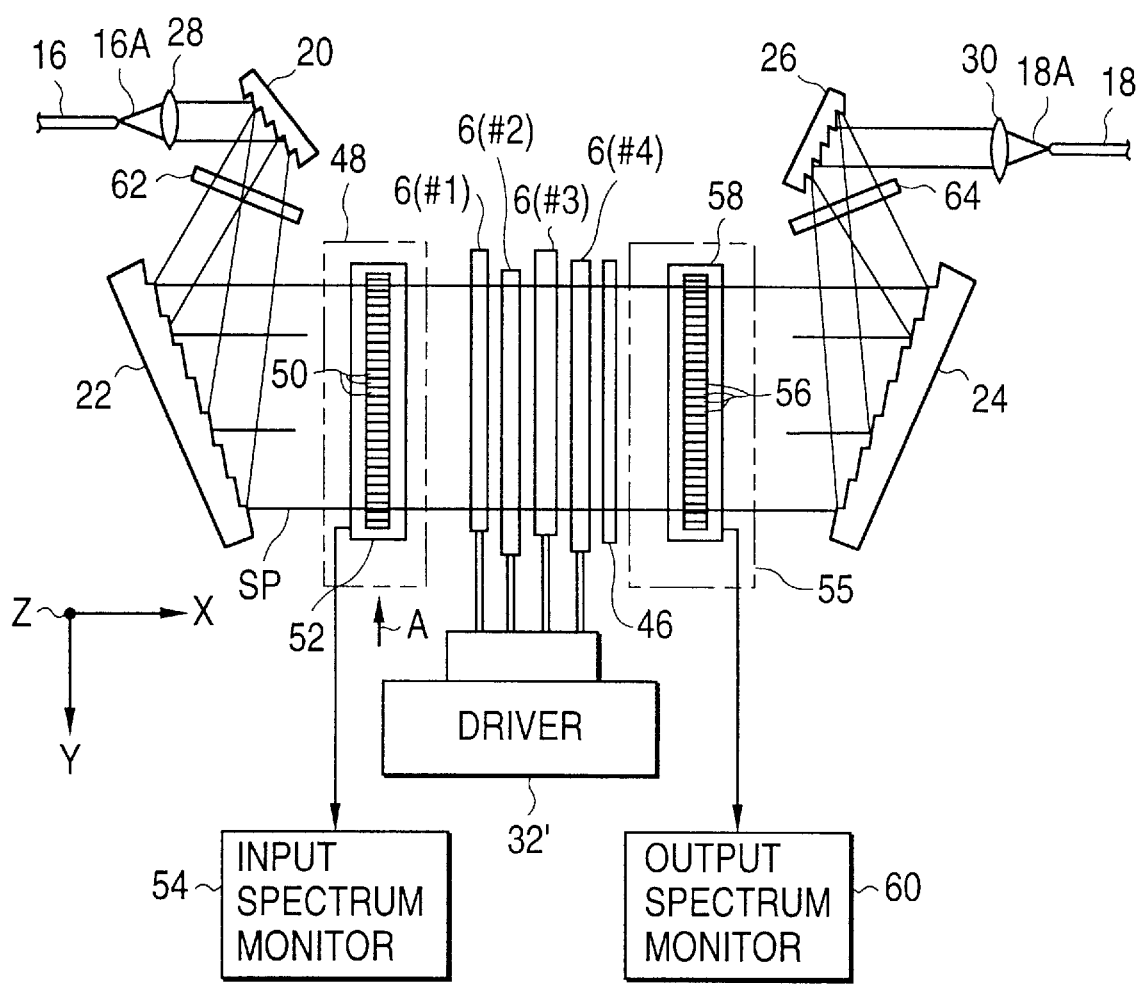
FIG. 12 is a diagram illustrating an optical equalizer, according to a further embodiment of the present invention.
Figure 13:
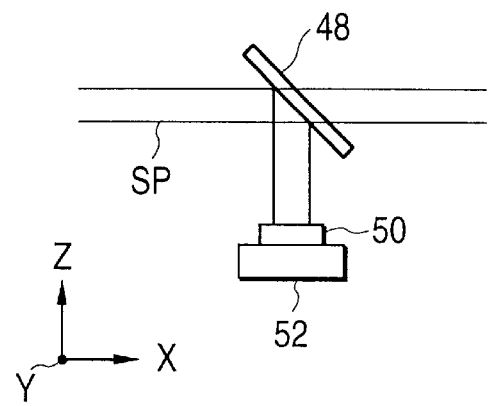
FIG. 13 is diagram of a portion of the optical equalizer illustrated in FIG. 12, taken from the direction of arrow A in FIG. 12, according to an embodiment of the present invention.

FIG. 12 is a diagram illustrating an optical equalizer, according to a further embodiment of the present invention. FIG. 13 is diagram of a portion of the optical equalizer illustrated in FIG. 12, taken from arrow A in FIG. 12, according to an embodiment of the present invention. Moreover, FIG. 14 is a diagram further illustrating the optical equalizer illustrated in FIG. 12, according to an embodiment of the present invention.

Figure 14:
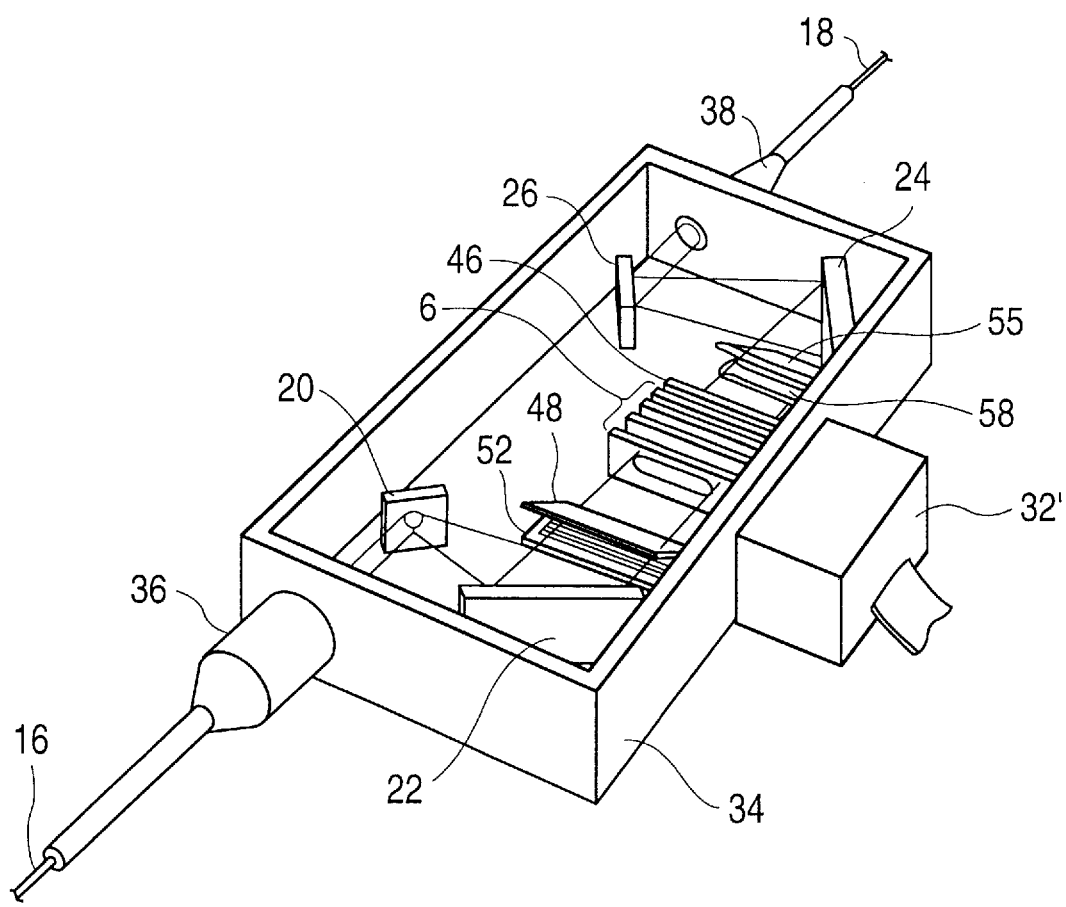
FIG. 14 is a diagram further illustrating the optical equalizer illustrated in FIG. 12, according to an embodiment of the present invention.

Referring now to FIGS. 12, 13 and 14, to monitor a spectrum of input light, a beam splitter 48 is provided between diffraction grating 22 and attenuator plate 6 (#1).

Beam splitter 48 branches a portion of spectral beam SP to obtain a branched beam corresponding to the input light. This branched beam is supplied to a photodetector array 52. Photodetector array 52 has a plurality of opto-electric conversion elements 50 arranged in a direction of change in wavelength of the branched beam (that is, in the Y direction). An input spectrum monitor 54 monitors the spectrum of the input light according to an output signal from photodetector array 52.

A semitransparent mirror may be used as beam splitter 48. In the case that the Z-direction length of spectral beam SP is larger than the photodetection diameter of each opto-electric conversion element 50, a cylindrical lens may be interposed between beam splitter 48 and photodetector array 52 to converge the branched beam with respect to the X direction.

A photodiode array, such as S4111 series manufactured by Hamamatsu Photonics Inc., may be used as photodetector array 52. Further, a linear image sensor having a charge coupled device (CCD) may also be used as photodetector array 52. Since the wavelength components of spectral beam SP are separated spatially along the Y direction, the spectrum of the input light can be easily monitored by using such a photodetector array.

To monitor a spectrum of output light, a beam splitter 55 is positioned between compensator plate 46 and diffraction grating 24. Beam splitter 55 branches spectral beam SP to obtain a branched beam corresponding to the output light. This branched beam is supplied to a photodetector array 58. Photodetector array 58 has a plurality of opto-electric conversion elements 56 arranged in a direction of change in wavelength of the branched beam (that is, in the Y direction). An output spectrum monitor 60 monitors the spectrum of the output light according to an output signal from photodetector array 58.

By monitoring the spectra of the input light and the output light in this manner, the wavelength characteristics of the optical equalizer can easily be computed. For example, this computation includes a comparison (obtaining a difference) between the output signals from photodetector arrays 52 and 58.

While the spectra of the input light and the output light are both monitored in the present embodiment of the present invention, the spectrum of either the input light or the output light may be monitored, without monitoring both the input light and the output light.

In FIG. 12, two optical rotating elements are substituted for half-wave plate 44 (see FIG. 9, for example) as an optical rotating element intersecting spectral beam SP. More specifically, a first optical rotating element is a half-wave plate 62 located between diffraction gratings 20 and 22. Half-wave plate 62 rotates a plane of polarization of its transmitted light by 90°. A second optical rotating element is a half-wave plate 64 located between diffraction gratings 24 and 26. Half-wave plate 64 rotates a plane of polarization of its transmitted light by 90°. The principle axes (optic axes) of half-wave plates 62 and 64 are inclined 45° with respect to the Z direction. Half-wave plates 62 and 64 are not illustrated in FIG. 14 to simplify the figure.

The polarization dependence in diffraction grating 20 and the polarization dependence in diffraction grating 22 are cancelled by half-wave plate 62. Further, the polarization dependence in diffraction grating 24 and the polarization dependence in diffraction grating 26 are cancelled by the half-wave plate 64. The polarization dependence in each diffraction grating is preferably eliminated to eliminate polarization dependence in monitoring the spectra.

In FIG. 12, beam splitters 48 and 55 function as branching devices to branch a portion of spectral beam SP. Moreover, for example, a semitransparent mirror can be used as such branching devices. However, the present invention is not intended to be limited to the use of a semitransparent mirror or a beam splitter as a branching device. Instead, many other types of mechanisms can be used to branch a portion of light from a spectral beam.

Figure 15:
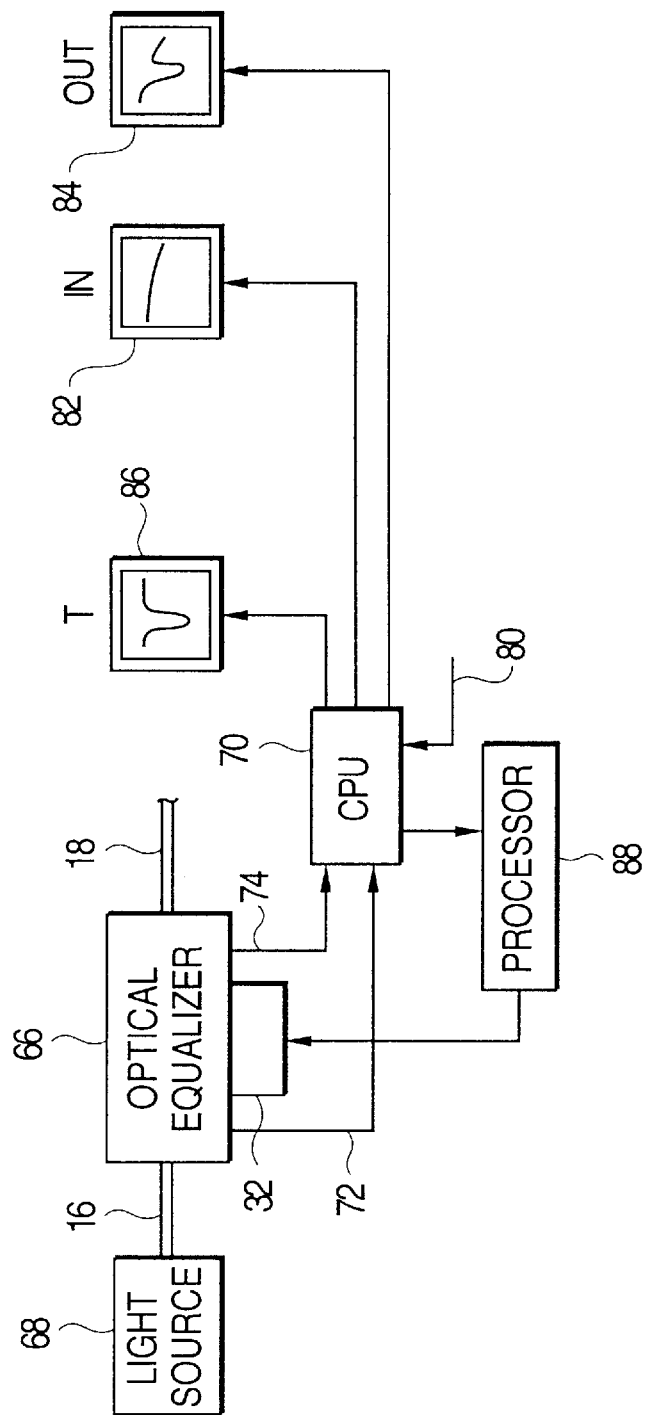
FIG. 15 is a diagram illustrating an automatic controller, according to an embodiment of the present invention.

FIG. 15 is a diagram illustrating an automatic controller, according to an embodiment of the present invention, and which is applicable to an optical equalizer according to the above embodiments of the present invention. Referring now to FIG. 15, an optical equalizer 66 includes an input spectrum monitor 54 (not illustrated in FIG. 15, but see FIG. 12) and an output spectrum monitor (not illustrated in FIG. 15, but see FIG. 12).

Light from a light source 68 is supplied through optical fiber 16 to optical equalizer 66, undergoes the effect of optical equalizer 66, and is then output through optical fiber 18. A central processing unit (CPU) 70 performs computation or control based on the monitoring results of input spectrum monitor (see FIG. 12) and output spectrum monitor (see FIG. 12) CPU 70 is supplied with a signal 72 from input spectrum monitor 54 (see FIG. 12), a signal 74 from output spectrum monitor (see FIG. 12), and data 80 on desired wavelength characteristics.

The results of monitoring of the spectra of input light into optical equalizer 66 and output light from optical equalizer 66 are fed from CPU 70 to display devices 82 and 84, respectively. Further, CPU 70 performs proper computation based on the results of monitoring of the spectra of the input light and the output light, and desired wavelength characteristics of optical equalizer 66 obtained as a result of this computation are fed from CPU 70 to a display device 80.

In some cases, CPU 70 performs electrical correction of the signals 72 and 74 from the input spectrum monitor 54 and the output spectrum monitor 60, respectively, so as to eliminate influence on the wavelength characteristics of diffraction gratings (especially, diffraction gratings 24 and 26 shown in FIG. 12). A processor 88 feeds a signal to driver 32' for controlling the position of each attenuator plate 6 (#1 to #4) according to a command from CPU 70.

Therefore, according to the present embodiment of the present invention, computation for obtaining desired arbitrary shaped wavelength characteristics can be easily automated because there is a simple correspondence between a factor to be adjusted (that is, the positioning of an attenuator plate) and wavelength characteristics to be obtained.

Figure 16:
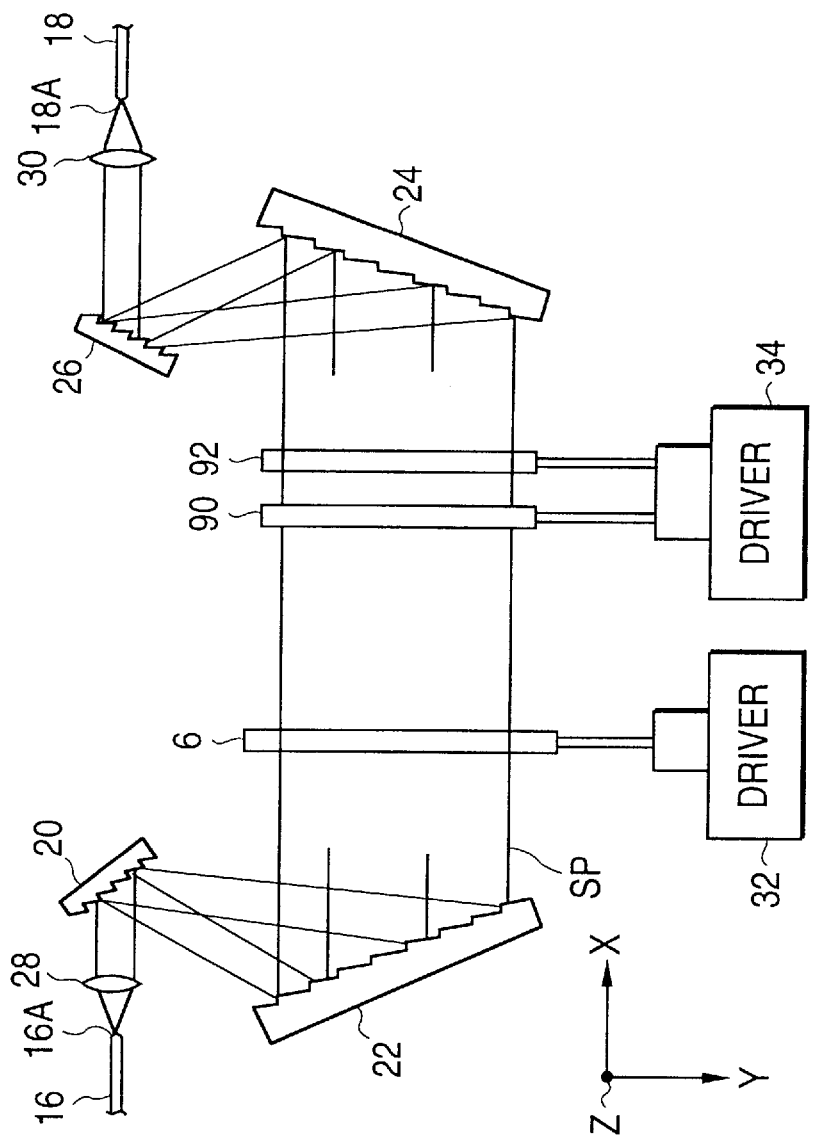
FIG. 16 is a diagram illustrating an optical equalizer, according to an embodiment of the present invention.

FIG. 16 is a diagram illustrating an optical equalizer, according to an additional embodiment of the present invention. In contrast with the embodiment of the present invention illustrated in FIG. 4, the embodiment of the present invention illustrated in FIG. 16 includes a wave plate 90 (that is, an optical rotating element) and a polarizer plate 92 between attenuator plate 6 and third diffraction grating 24. As illustrated in FIG. 16, wave plate 90 is between polarizer plate 92 and attenuator plate 6. Wave plate 90 and polarizer plate 92 are connected to a driver 94, and are individually moved and positioned in the YZ plane by driver 94.

Figure 17A:
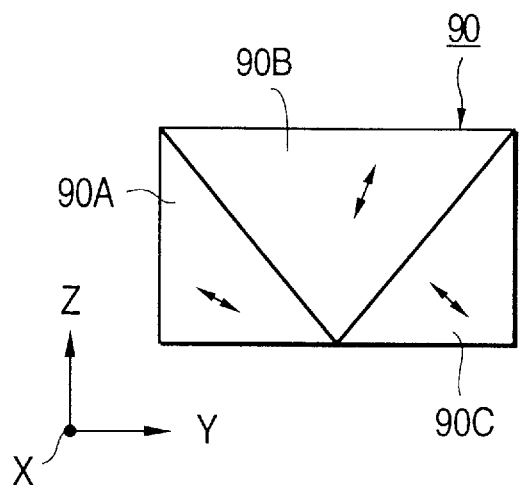
FIG. 17(A) and 17(B) are diagrams illustrating a wave plate and a polarizer plate, respectively, of the optical equalizer illustrated in FIG. 16, according to an embodiment of the present invention.

FIG. 17(A) is a diagram illustrating wave plate 90, according to an embodiment of the present invention. Referring now to FIG. 17(A), wave plate 90 includes three regions 90A, 90B, and 90C having principle axes which are different in direction. However, the number of the regions on wave plate 90 is not intended to be limited to three, and may be greater than three or equal to two.

Figure 17B:
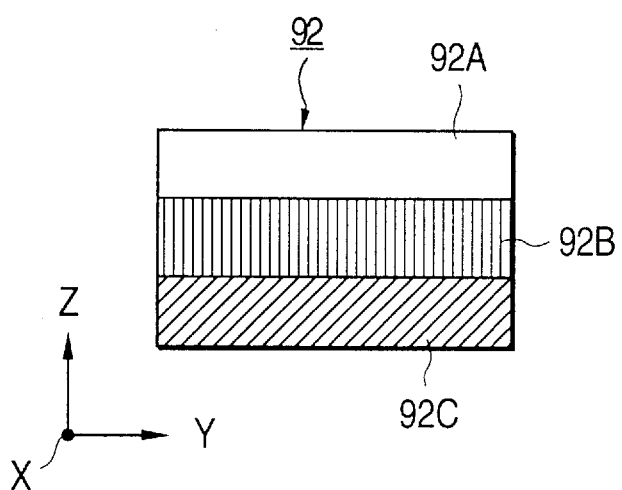

FIG. 17(B) is a diagram illustrating polarizer plate 92, according to an embodiment of the present invention. Referring now to FIG. 17(B), polarizer plate 92 includes a transparent region 92A, a polarizer region 92B, and a block region 92C.

Assuming that driver 94 is controlled so that polarizer plate 92 does not intersect spectral beam SP and wave plate 90 intersects spectral beam SP in FIG. 16, it is possible to provide an output light polarization condition changing according to wavelength. Further, by using wave plate 90, the optical equalizer can be made to function as a depolarizer. Conversely, by controlling driver 94 so that wave plate 90 does not intersect spectral beam SP and polarizer plate 92 intersects spectral beam SP, and displacing polarizer plate 92 along the Z axis in this condition, a degree of polarization can be changed.

In the case that the Z-direction length of polarizer region 92B is constant as shown in FIG. 17(B), flat wavelength-polarization characteristics are obtained. By changing the Z-direction length of polarizer region 92B in the Y direction, arbitrary wavelength-polarization characteristics can be obtained. That is, an arbitrary degree of polarization can be obtained according to wavelength.

Figure 18:
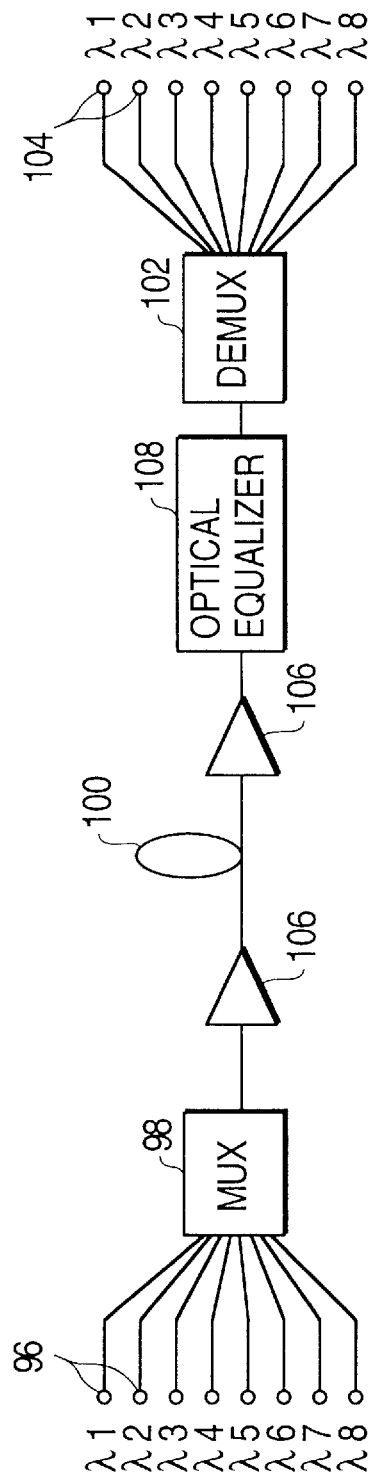
FIG. 18 is a diagram illustrating a wavelength division is multiplexed (WDM) optical communication system having an optical equalizer according to an embodiment of the present invention.

FIG. 18 is a diagram illustrating a wavelength division multiplexed (WDM) optical communication system having an optical equalizer according to an embodiment of the present invention. More specifically, FIG. 18 illustrates an example where eight (8) signal light beams are wavelength division multiplexed together to form a single WDM signal light. However, the present invention is not intended to be limited to wavelength division multiplexing of eight (8) signal light beams. Instead, virtually any number of signal light beams can be wavelength division multiplexed together, depending on the optical system configuration.

Referring now to FIG. 18, eight (8) signal light beams having different wavelengths $\lambda_1$ to $\lambda_8$, respectively, are provided to input ports 96 of an optical multiplexer 98. Optical multiplexer 98 wavelength division multiplexes the signal light beams together to obtain a WDM signal light including wavelength components corresponding to each of the individual signal light beams. Therefore, each individual signal light beam provided to optical multiplexer 98 is considered to be a channel included in the WDM signal light. The WDM signal light output from optical multiplexer 98 is transmitted through an optical fiber transmission line 100 to a receiving station 103.

Receiving station 103 includes an optical demultiplexer 102 for dividing the WDM signal light into a plurality of signal light beams corresponding to the channels of the WDM signal light. The signal light beams thus obtained are output from a plurality of output ports 104. The number of output ports 104 corresponds to the number of the channels.

A plurality of optical amplifiers 106 (for example, two optical amplifiers 106 are illustrated in FIG. 18) are provided along optical fiber transmission line 100 to amplify the WDM signal light. Further, an optical equalizer 108 according to any of the embodiments of the present invention described herein is positioned upstream of optical demultiplexer 102.

Any of optical amplifiers 106 may be an optical booster provided in a transmitting station. That is, any of optical amplifiers 106 can be provided just downstream of optical multiplexer 98, or may be incorporated in an optical repeater. Also, for example, any of optical amplifiers 106 can be an optical postamplifier provided in receiving station 103.

Figure 19:
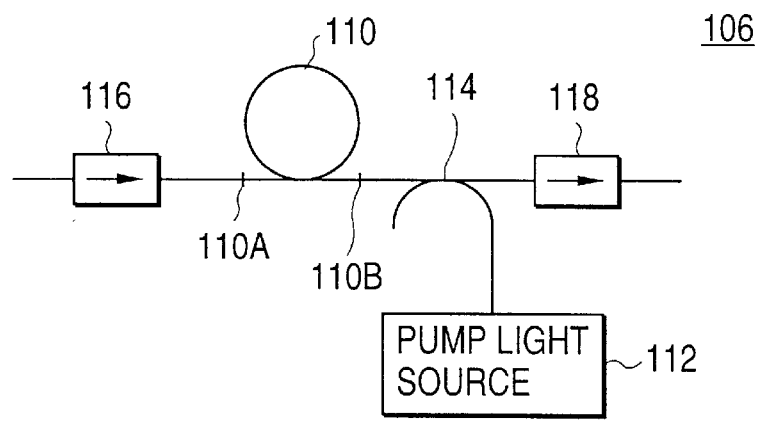
FIG. 19 is a diagram illustrating an optical amplifier.

FIG. 19 is a diagram illustrating an optical amplifier for use as any of optical amplifiers 106 illustrated in FIG. 18.

Referring not to FIG. 19, the optical amplifier includes a doped fiber (optical amplifying medium) 110 having a first end 110A and a second end 110B. A pump light source 112, such as a laser diode, produces pump light. An optical coupler 114 couples the pump light produced by pump light source 112 to second end 110B of doped fiber 110. A WDM coupler having a coupling ratio dependent on wavelength may be used as optical coupler 114. Optical isolators 116 and 118 are typically provided before and after, respectively, doped fiber 110. For various reasons, a 1.55μ band is a typical wavelength band used in optical WDM optical communication systems. Therefore, for example, in the case that the wavelengths of WDM signal light to be amplified fall within a 1.55μ band, erbium (Er) is suitable as the dopant of doped fiber 110. In this case, the wavelength of the pump light is preferably set to fall within a 0.98 μm band or a 1.48 μm band for proper optical amplifier operation.

When the pump light is supplied to doped fiber 110, doped fiber 110 is pumped so as to have a gain band including the wavelengths of the WDM signal light. Therefore, the pump light causes the WDM signal light to be amplified as the WDM signal light propagates through doped fiber 110.

The amplified WDM signal light is passed through optical coupler 114 and optical isolator 118, and then output from the optical amplifier. Generally, optical isolators 116 and 118 contain the pump light in the optical communication system.

In the configuration shown in FIG. 19, optical coupler 114 is connected to second end 110B of doped fiber 110 so that the WDM signal light and the pump light propagate in opposite directions in doped fiber 110. That is, backward pumping is performed in this configuration. Alternatively, a pump light source may be operatively connected to first end 110A of doped fiber 110 so that the WDM signal light and pump light from this pump light source propagate in the same direction in doped fiber 110, thereby performing forward pumping. Further, bidirectional pumping may also be performed by using two pump light sources. Forward, backward and bidirectional pumping configurations are known in the art.

When using an optical amplifier (such as the optical amplifier illustrated in FIG. 19) in a WDM optical communication system, it is necessary to cope with gain tilt of the optical amplifier.

Figure 20:
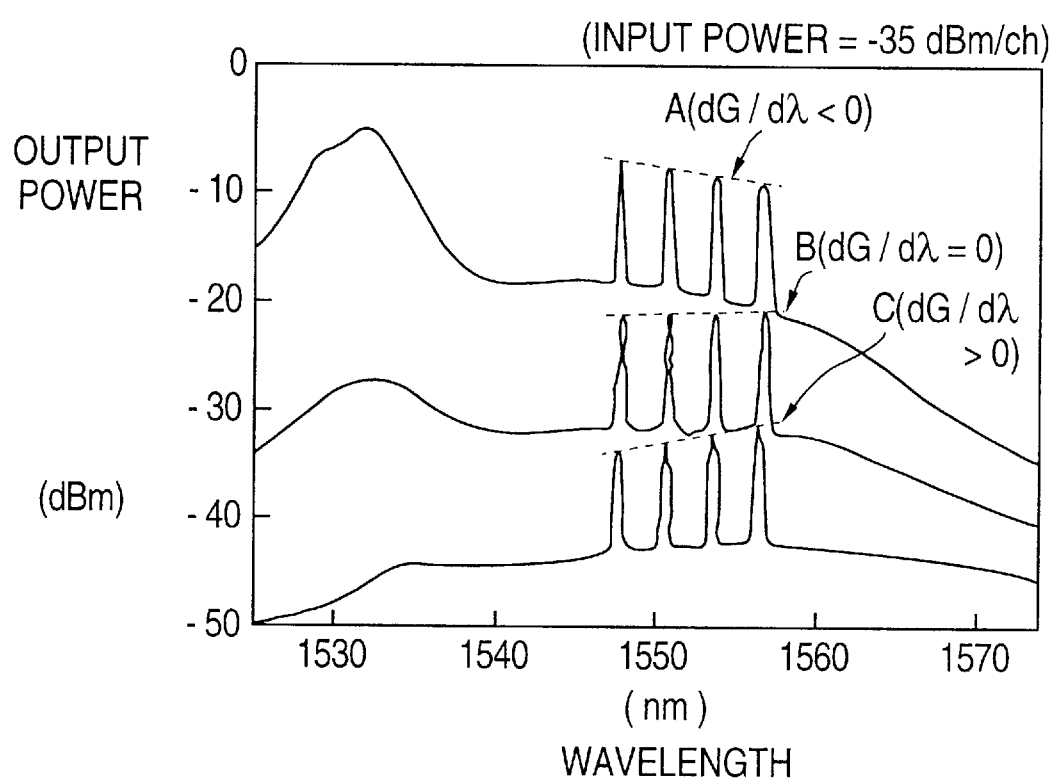
FIG. 20 is a graph illustrating gain tilt of an optical amplifier.

FIG. 20 is a graph illustrating gain tilt of an optical amplifier. More specifically, FIG. 20 shows spectra of output lights at a receiving station for a WDM signal light having four channels of wavelengths of 1548 nm, 1551 nm, 1554 nm, and 1557 nm, respectively, provided with the same input power (−35 dBm/ch) to a doped fiber of an optical amplifier. In FIG. 20, the vertical axis represents output power (dBm) and the horizontal axis represents wavelength (nm).

The spectrum "A" in FIG. 20 corresponds to the case where the power of pump light is relatively large. In this case, a negative gain tilt occurs. That is, the differential of gain with respect to wavelength is negative ($dG/d\lambda < 0$).

The spectrum "C" in FIG. 20 corresponds to the case where the power of pump light is relatively low. In this case, a positive gain tilt is obtained ($dG/d\lambda > 0$).

The spectrum "B" in FIG. 20 corresponds to the case where the power of pump light is optimum such that no gain tilt occurs. In this case, the differential of gain with respect to wavelength is 0 ($dG/d\lambda = 0$). Each spectrum shown in FIG. 20 has such a shape that four sharp spectra corresponding to the four channels of the WDM signal light are superimposed on a spectrum of ASE (amplified spontaneous emission).

In this manner, the gain tilt (wavelength characteristics) in each optical amplifier 106 shown in FIG. 18 changes depending upon at least the power of the corresponding pump light. Further, the gain tilt changes in a complicated manner in accordance with the power of the signal light in each channel and environmental conditions (for example, temperature).

If the gain tilt is accumulated through a plurality of optical amplifiers, the intensities of signal light beams in all the channels to be received by a receiving station become different, causing variations in signal-to-noise ratio between the channels. To cope with this problem, an optical equalizer according to embodiments of the present invention described herein can be applied to a WDM optical communication system, as illustrated, for example, in FIG. 18 (see optical equalizer 108 in FIG. 18). More specifically, as previously described, an optical equalizer according to embodiments of the present invention described herein can obtain desired shaped wavelength characteristics. Therefore, such an optical equalizer can be used to compensate for gain tilt. For example, in the optical communication system shown in FIG. 18, the wavelength characteristics of optical equalizer 108 can be adjusted so that relative powers of signal light beams in all the channels to be output from the output ports 104 become constant.

Although FIG. 18 illustrates optical equalizer 108 positioned near receiving station 103, optical equalizer 108 can be positioned at many different positions. For example, optical equalizer 108 may be positioned immediately downstream of optical multiplexer 98. In this case, the gain tilt occurring in each optical amplifier 106 is predicted, and the power of the signal light beam in each channel is preliminarily weighted according to a predicted value of the gain tilt. Such a method is referred to as "preemphasis".

Figure 21:
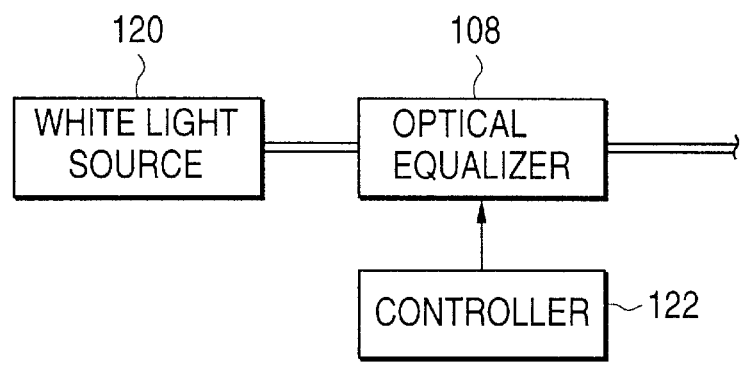
FIG. 21 is a diagram of a light source device which includes an optical equalizer according to embodiments of the present invention.

FIG. 21 is a diagram of a light source device using an optical equalizer according to embodiments of the present invention is applied. Referring now to FIG. 21, the light source device includes a white light source 120 and an optical equalizer 108 according to embodiments of the present invention described herein. The white light source 120 produces white light having a relatively flat spectrum over a wide wavelength band. The white light is output through optical equalizer 108. The wavelength characteristics of optical equalizer 108 are adjusted by a controller 122. According to this configuration, it is possible to provide a light source having arbitrary, selectable wavelength characteristics.

The optical equalizer shown in FIG. 16 and the light source device shown in FIG. 21 are useful for evaluating an optical communication system. For example, the optical equalizer and light source device can be used to evaluate polarization dependence characteristics of an optical communication system.

Figure 22:
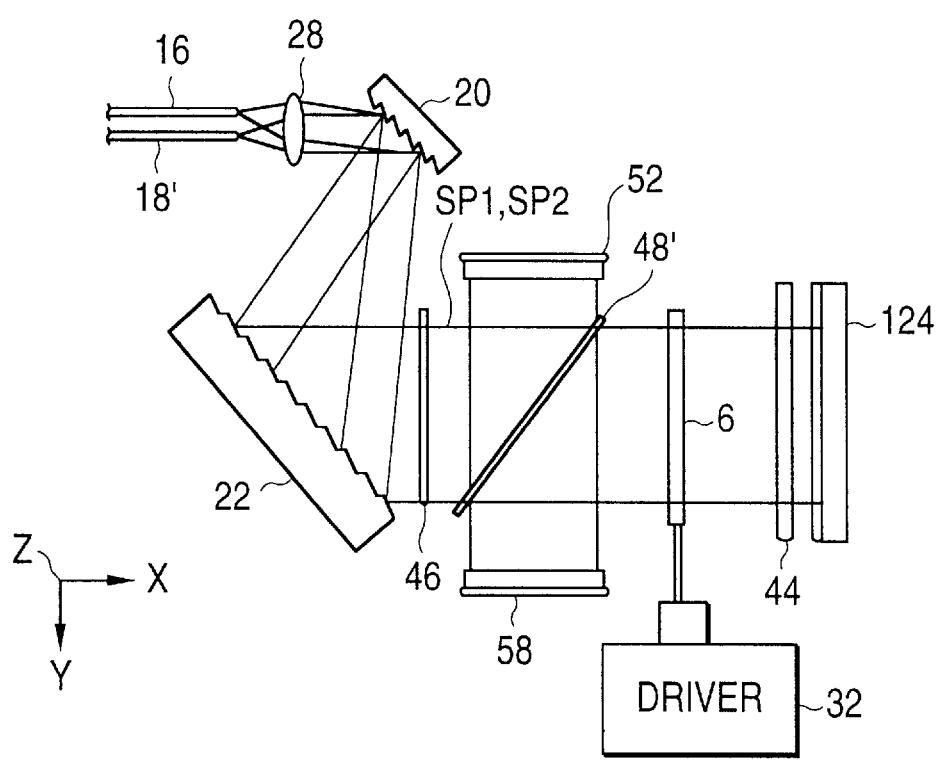
FIG. 22 is a diagram illustrating an optical equalizer according to an embodiment of the present invention.

FIG. 22 is a diagram illustrating an optical equalizer according to a further embodiment of the present invention. Referring now to FIG. 22, a mirror 124 is used as a reflecting device to allow diffraction gratings 20 and 22 to function not only as beam expander 2 (see FIG. 1), but also as beam condenser 4 (see FIG. 1), thereby eliminating the need for diffraction grating 24 (see, for example, FIG. 4), diffraction grating 26 (see, for example, FIG. 4) and lens 30 (see, for example, FIG. 4).

An optical fiber 16 determines an optical path of the input light and an optical fiber 18' determines an optical path for the output light. Optical fibers 16 and 18' are slightly spaced from each other in the Z direction. While FIG. 20 shows that optical fibers 16 and 18' are slightly spaced from each other in the Y direction, such spacing is not required and is only illustrated so that optical fiber 18' can easily been seen in the figure.

Light emerging from the excitation end of optical fiber 16 is converted into a collimated beam by lens 28, and this collimated beam is diffracted by diffraction grating 20.

The diffracted light from diffraction grating 20 is further diffracted by diffraction grating 22 and thereby converted into a spectral beam SP1 whose wavelength components are separated spatially along the Y axis. The spectral beam SP1 is passed through compensator plate 46, a beam splitter 48', attenuator plate 6, and half-wave plate 44, in this order, and then reflected by mirror 124 to obtain a reflected beam SP2. An angle formed between a direction of incidence of spectral beam SP1 on mirror 124 and a direction of reflection of reflected beam SP2 on mirror 124 is defined as a very small acute angle in the YZ plane.

Reflected beam SP2 is passed through half-wave plate 44, attenuator plate 6, beam splitter 48', and compensator plate 46, in this order, and then supplied to diffraction grating 22.

Diffraction gratings 22 and 20 function as a beam condenser for reflected beam SP2, so that the diffracted light from diffraction grating 20 becomes a collimated beam whose wavelength components are not separated spatially. This collimated beam is converged by lens 28 to enter optical fiber 18'.

Since spectral beam SP1 and reflected beam SP2 are substantially superimposed on each other, the spectra of both the input light and the output light can be monitored by using the single beam splitter 48'. Therefore, the number of parts in the overall system can be reduced as compared to earlier described embodiments of the present invention.

Spectral beam SP1 propagating from the left to the right, as viewed in FIG. 22, is partially branched by beam splitter 48', and a resultant branched beam is supplied to photodetector array 52. Further, reflected beam SP2 propagating from the right to the left, as viewed in FIG. 22, is partially branched by beam splitter 48', and a resultant branched light is supplied to photodetector array 58. Input spectrum monitor 54 and output spectrum monitor 60 (illustrated in FIG. 12, but not in FIG. 22) are connected to photodetector arrays 52 and 58, respectively. In this manner, the spectra of both the input light and the output light can be monitored by using the single beam splitter 48'.

Although mirror 124 is used to convert spectral beam SP1 into reflected beam SP2 in the present embodiment of the present invention, any other appropriate reflecting device (such as, for example, a prism) may be used.

Figure 23:
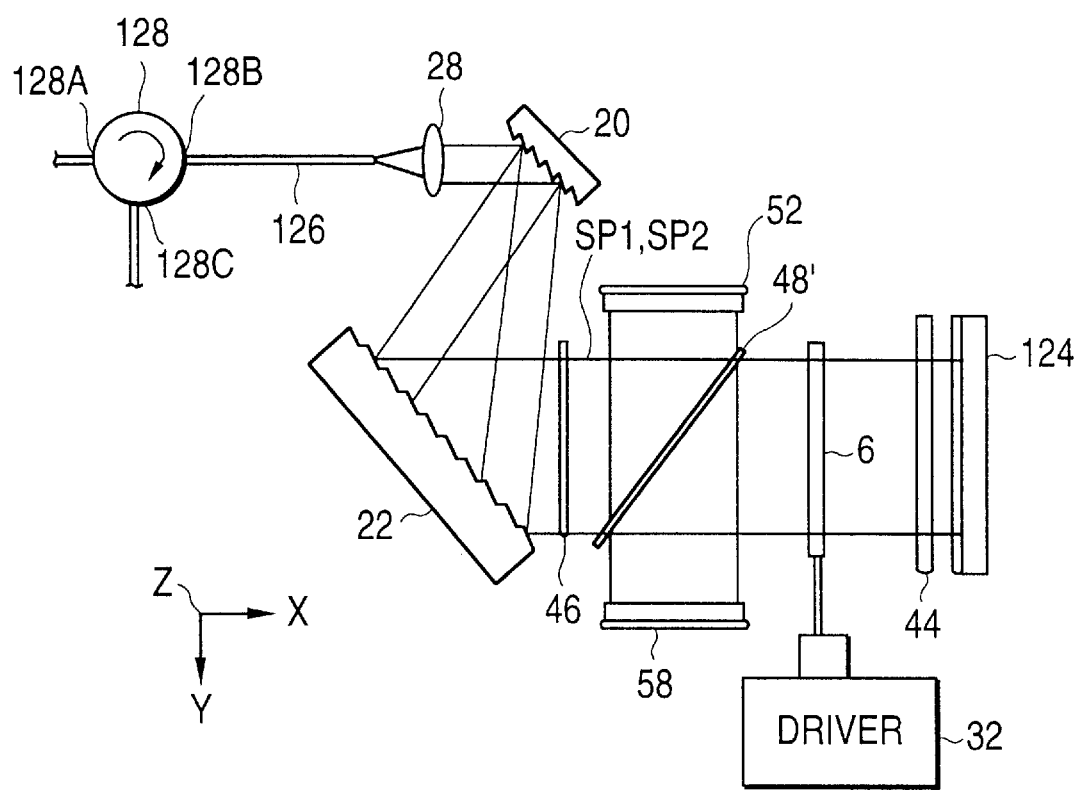
FIG. 23 is a diagram illustrating an optical equalizer according to a still further embodiment of the present invention.

FIG. 23 is a diagram illustrating an optical equalizer according to a still further embodiment of the present invention. In contrast with the embodiment of the present invention illustrated in FIG. 22, the embodiment of the present invention illustrated in FIG. 23 includes a common optical fiber 126 for determining both an optical path for the input light and an optical path for the output light.

An optical circulator 128 is operatively connected to optical fiber 126 to separate the input light and the output light. Optical circulator 128 has ports 128A, 128B, and 128C. Light supplied to port 128A is output from port 128B, and light supplied to port 128B is output from port 128C.

Since the optical path of the input light and the optical path of the output light are set in the same position, mirror 124 is perpendicular to spectral beam SP1 (that is, parallel to the YZ plane). In other words, the angle formed between the direction of incidence of spectral beam SP1 on mirror 124 and the direction of reflection of reflected beam SP2 on mirror 124 is 0.

According to the embodiment of the present invention illustrated in FIG. 22, the optical axis of common optical fiber 126 can be easily adjusted as compared with the separate optical fibers 16 and 18' in FIG. 22.

According to the above embodiments of the present invention, a converter (such as beam expander 2 or beam condenser 4 in FIG. 1) can be used to convert an input light into a spectral beam, or to convert a spectral beam into an output light. As shown in the various embodiments of the present invention, such a converter typically includes at least one diffraction grating. However, many other types of converters can be used to convert one type of light into another type of light, and the present invention is not intended to be limited to the use of converters using diffraction gratings.

According to the above embodiments of the present invention, an attenuator (such as, for example, attenuator 6 in FIG. 4) is typically a "plate". However, the present invention is not intended to be limited to attenuators having a "plate" shape. Instead, an attenuator can have virtually any shape, as long as the attenuator includes an appropriate distribution of transmittance to provide the required attenuation effect.

Moreover, according to the above embodiments of the present invention, an attenuator typically includes a planer distribution of transmittance in a plane which is "perpendicular" to the propagation direction of an intersected spectral beam. For example, see the planer distribution of transmittance of attenuator 6 illustrated in FIGS. 1, 5(A), 5(C), 5(E), 6(A), 6(C) and 6(E). However, the present invention is not intended to be limited to an attenuator having a planer distribution of transmittance in a plane which is "perpendicular" to the propagation direction of an intersected spectral beam. Instead, the planer distribution of transmittance should simply be in a plane which is not parallel to the propagation direction, so that the planer distribution of transmittance interacts with the spectral beam. For example, the planer distribution of transmittance can be oblique with respect to the propagation direction of the spectral beam.

Similarly, according to the above embodiments of the present invention, an attenuator is movable in a plane which is "perpendicular" to the propagation direction of an intersected spectral beam. However, the present invention is not intended to be limited to an attenuator which is movable in a plane which is "perpendicular" to the propagation direction of an intersected spectral beam. Instead, the attenuator can be movable in any plane which is not parallel to the propagation direction, so that the attenuator can be made to intersect with different portions of the spectral beam. For example, the attenuator can be movable in a plane which is oblique with respect to the propagation direction of the spectral beam.

Various attenuator plates are illustrated in FIGS. 5(A), 5(C), 5(E), 6(A), 6(C), 6(E), 7(A), 7(C) and 7(E). Each of these different attenuator plates can be used in any of the embodiments of the present invention described above.

Although preferred embodiments of the invention have been shown and described, it will be appreciated by those skilled in the art that changes may be made in these embodiments without departing from the principles and spirit of the invention, the scope of which is defined in the appended claims and their equivalents.

What is claimed is:

1. An apparatus which attenuates a spectral beam propagating in a first direction and having wavelength components spatially separated in a second direction perpendicular to the first direction, the apparatus comprising:

an attenuator intersecting the spectral beam and having a planer distribution of transmittance in a first plane which is not parallel to the first direction so that the spectral beam passes through the attenuator and is attenuated in accordance with the planer distribution of transmittance, the attenuator being movable in a second plane which is not parallel to the first direction.

2. An apparatus as in claim 1, wherein the second plane is substantially perpendicular to the first direction.

3. An apparatus as in claim 1, wherein the first and second planes are the same.

4. An apparatus as in claim 1, wherein the first and second planes are the same and are perpendicular to the first direction.

5. An apparatus as in claim 1, further comprising:
a first converter which receives an input light and converts the input light into the spectral beam intersected by the attenuator; and
a second converter which receives the spectral beam from the first converter and converts to received spectral beam into an output light, wherein the attenuator is positioned between the first and second converters to attenuate the spectral beam as the spectral beam travels from the first converter to the second converter.

6. An apparatus as in claim 1, wherein the attenuator is a plate.

7. An apparatus as in claim 5, wherein:
the first converter includes
first and second diffraction gratings arranged so that the input light is diffracted from the first diffraction grating to the second diffraction grating and then diffracted by the second diffraction grating to produce the spectral beam; and
the second converter includes
first and second diffraction gratings arranged so that the spectral beam is received by the first diffraction grating of the second converter from the second diffraction grating of the first converter, diffracted to the second diffraction grating of the second converter and then diffracted by the second diffraction grating of the second converter to produce the output light.

8. An apparatus as in claim 7, wherein
the first and second diffraction gratings of the first converter have substantially equal grating constants, and the first and second diffraction gratings of the second converter have substantially equal grating constants.

9. An apparatus as in claim 7, further comprising:
a first optical rotating element positioned between the first and second diffraction gratings of the first converter and rotating a plane of polarization of light diffracted from the first diffraction grating of the first converter to the second diffraction grating of the first converter by 90°; and
a second optical rotating element positioned between the first and second diffraction gratings of the second converter and rotating a plane of polarization of light diffracted from the first diffraction grating of the second converter to the second diffraction grating of the second converter by 90°.

10. An apparatus as in claim 9, wherein the first and second optical rotating elements are half-wave plates.

11. An apparatus as in claim 10, wherein the first and second optical rotating elements are each inclined with respect to the first direction.

12. An apparatus as in claim 1, further comprising:
an optical rotating element intersecting the spectral beam and rotating a plane of polarization of the spectral beam by 90°.

13. An apparatus as in claim 12, wherein the optical rotating element is a half-wave plate having a principal axis inclined 45° with respect to the second direction.

14. An apparatus as in claim 1, wherein the attenuator is movable in at least one of the group comprising the second direction and a direction perpendicular to the first and second directions.

15. An apparatus as in claim 1, wherein the attenuator is rotatable with the first direction as an axis of rotation.

16. An apparatus as in claim 1, wherein the planar distribution of transmittance of the attenuator includes a plurality of equitransmittance lines in the first plane.

17. An apparatus as in claim 1, wherein the planar distribution of transmittance of the attenuator includes a plurality of equitransmittance lines sequentially arranged from a first equitransmittance line to a last equitransmittance line arranged in the first plane, the first plane being perpendicular to the first direction.

18. An apparatus as in claim 1, wherein the planar distribution of transmittance of the attenuator includes a plurality of equitransmittance lines concentrically arranged in the first plane.

19. An apparatus as in claim 1, wherein the attenuator includes a blocking portion in the first plane which does not allow light to pass therethrough and extends in a third direction perpendicular to the first and second directions.

20. An apparatus as in claim 19, wherein the blocking portion has a nonuniform width in the second direction.

21. An apparatus as in claim 1, wherein the attenuator includes a transmitting stripe in the first plane and extending in a third direction perpendicular to the first and second directions.

22. An apparatus as in claim 21, wherein the transmitting stripe has a nonuniform width in the first plane along a direction perpendicular to the third direction.

23. An apparatus as in claim 1, wherein the attenuator comprises:
a plurality of individual attenuators, each individual attenuator intersecting the spectral beam and having a planer distribution of transmittance in a corresponding first plane which is not parallel to the first direction.

24. An apparatus as in claim 23, wherein each individual attenuator is movable in a corresponding second plane which is not parallel to the first direction.

25. An apparatus as in claim 24, wherein, for each individual attenuator, the corresponding second plane is substantially perpendicular to the first direction.

26. An apparatus as in claim 24, wherein, for each individual attenuator, the corresponding first and second planes are the same and are perpendicular to the first direction.

27. An apparatus as in claim 23, wherein each individual attenuator has a transmittance in the corresponding first plane which periodically changes at a different period of change than the transmittance of the other individual attenuators.

28. An apparatus as in claim 5, further comprising:
a compensator intersecting the spectral beam as the spectral beam travels from the first converter to the second converter and having a distribution of transmittance which cancels wavelength characteristics of the first and second converters.

29. An apparatus as in claim 5, further comprising:
a first branching device which branches a portion of the spectral beam as the spectral beam travels between the first converter and the attenuator; and
a first spectrum monitor which monitors a spectrum of the spectral beam from the portion branched by the first branching device.

30. An apparatus as in claim 29, further comprising:
a second branching device which branches a portion of the spectral beam as the spectral beam travels between the attenuator and the second converter; and
a second spectrum monitor which monitors a spectrum of the spectral beam from the portion branched by the second branching device.

31. An apparatus as in claim 30, further comprising:
a processing device which monitors wavelength characteristics of the apparatus from the spectrums monitored by the first and second spectrum monitors.

32. An apparatus as in claim 5, further comprising:
a branching device which branches a portion of the spectral beam as the spectral beam travels between the attenuator and the second converter; and
a spectrum monitor which monitors a spectrum of the spectral beam from the portion branched by the branching device.

33. An apparatus as in claim 5, further comprising:
an optical amplifier which amplifies at least one of the group comprising the input light and the output light.

34. An apparatus as in claim 5, further comprising:
a light source which produces white light as the input light.

35. An apparatus as in claim 5, further comprising:
a polarizer which intersects at least a portion of the spectral beam, for changing the polarization condition of said intersected at least a portion of the spectral beam.

36. An apparatus as in claim 5, further comprising:
a wave plate which includes a plurality of regions intersecting the spectral beam, each region having a polarization changing condition which is different from the polarization changing condition of the other regions and a principle axis of direction which is different from the principle axis of direction of the other regions.

37. An apparatus as in claim 1, further comprising:
a converter which receives an input light and converts the input light into the spectral beam intersected by the attenuator, the converted spectral beam being defined as a first spectral beam; and
a reflecting device which reflects the first spectral beam after the first spectral beam passes through the attenuator, to produces a reflected spectral beam defined as a second spectral beam, wherein the second spectral beam passes through the attenuator and is then converted by the converter into an output light.

38. An apparatus as in claim 37, wherein the converter includes first and second diffraction gratings arranged so that
the input light is diffracted from the first diffraction grating to the second diffraction grating and then diffracted by the second diffraction grating to produce the first spectral beam, and
the second spectral beam is received by the second diffraction grating, diffracted to the first diffraction grating and then diffracted by the first diffraction grating to produce the output light.

39. An apparatus as in claim 38, wherein, with respect to a perpendicular to the second direction, an acute angle is formed between the direction of incidence of the first spectral beam on the reflecting device and the direction of reflectance of the second spectral beam off the reflecting device.

40. An apparatus as in claim 37, further comprising:
a first optical fiber which provides the input light to the converter; and
a second optical fiber which receives the output light from the converter.

41. An apparatus as in claim 37, further comprising:
a common optical fiber which provides the input light to the converter and receives the output light from the converter; and
an optical circulator connected to the common optical fiber for separating the input light and the output light.

42. An apparatus as in claim 41, wherein, with respect to a perpendicular to the second direction, an angle of 0° is formed between the direction of incidence of the first spectral beam on the reflecting device and the direction of reflectance of the second spectral beam off the reflecting device.

43. An apparatus which attenuates a light beam propagating in a first direction and having wavelength components spatially separated in a second direction perpendicular to the first direction, the apparatus comprising:
an attenuator intersecting the light beam and having a planer distribution of transmittance so that the light beam passes through the attenuator and is attenuated in accordance with the planer distribution of transmittance.

44. An apparatus as in claim 43, wherein the attenuator is movable in a plane which is not parallel to the first direction.

45. An apparatus as in claim 43, wherein the planar distribution of transmittance of the attenuator includes a plurality of equitransmittance lines spaced apart from each other and in the same plane.

46. An apparatus as in claim 43, wherein the planar distribution of transmittance of the attenuator includes a plurality of equitransmittance lines concentrically arranged in the same plane.

47. An apparatus as in claim 43, wherein the attenuator includes a blocking portion which does not allow light to pass therethrough.

48. An apparatus as in claim 43, wherein the attenuator comprises:
a plurality of individual attenuators, each individual attenuator intersecting the light beam and having a corresponding planer distribution of transmittance so that the light beam passes through the individual attenuator and is attenuated in accordance with the corresponding planer distribution of transmittance.

49. An apparatus as in claim 48, wherein each individual attenuator is movable in a direction substantially perpendicular to the first direction.

50. An apparatus as in claim 48, wherein each individual attenuator has a transmittance in the corresponding planer distribution of transmittance which periodically changes at a different period of change than the transmittance of the other individual attenuators.

51. An apparatus for attenuating an input light, comprising:
a first converter which converts the input light into a spectral beam propagating in a first direction and having wavelength components spatially separated in a second direction perpendicular to the first direction;
an attenuator intersecting the spectral beam and having a planer distribution of transmittance so that the spectral beam passes through the attenuator and is attenuated in accordance with the planer distribution of transmittance; and
a second converter which converts the attenuated spectral beam into an output light.

52. An apparatus as in claim 51, wherein the attenuator is movable in a plane which is substantially perpendicular to the first direction.

53. An apparatus as in claim 51, wherein the attenuator is movable in a plane which is not parallel to the first direction.

54. An apparatus as in claim 51, wherein the planar distribution of transmittance of the attenuator includes a plurality of equitransmittance lines spaced apart from each other and in the same plane.

55. An apparatus as in claim 51, wherein the planar distribution of transmittance of the attenuator includes a plurality of equitransmittance lines concentrically arranged in the same plane.

56. An apparatus as in claim 51, wherein the attenuator comprises:

a plurality of individual attenuators, each individual attenuator intersecting the spectral beam and having a corresponding planer distribution of transmittance for attenuating the spectral beam in accordance with the corresponding planer distribution of transmittance.

57. An apparatus as in claim 56, wherein each individual attenuator is movable in a direction substantially perpendicular to the first direction.

58. An apparatus as in claim 56, wherein each individual attenuator has a corresponding planer distribution of transmittance which periodically changes at a different period of change than the corresponding planer distribution of transmittances of the other individual attenuators.

* * * * *